(12) United States Patent
Kim

(10) Patent No.: US 10,595,359 B2
(45) Date of Patent: Mar. 17, 2020

(54) METHODS OF MANAGING TERMINAL PERFORMED IN BASE STATION AND TERMINAL

(71) Applicant: Electronics and Telecommunications Research Institute, Daejeon (KR)

(72) Inventor: Jae Heung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/261,421

(22) Filed: Jan. 29, 2019

(65) Prior Publication Data

US 2019/0159076 A1 May 23, 2019

Related U.S. Application Data

(62) Division of application No. 15/683,297, filed on Aug. 22, 2017, now Pat. No. 10,244,436, which is a
(Continued)

(30) Foreign Application Priority Data

Mar. 2, 2012 (KR) ...................... 10-2012-0021843
Mar. 16, 2012 (KR) ...................... 10-2012-0027389
(Continued)

(51) Int. Cl.
*H04W 76/28* (2018.01)
*H04W 48/04* (2009.01)
(Continued)

(52) U.S. Cl.
CPC .......... *H04W 76/28* (2018.02); *H04L 5/0053* (2013.01); *H04W 24/02* (2013.01); *H04W 24/10* (2013.01);
(Continued)

(58) Field of Classification Search
CPC ..... H04W 48/04; H04W 48/08; H04W 48/16; H04W 52/28; H04W 76/20; H04W 76/36;
(Continued)

(56) References Cited

U.S. PATENT DOCUMENTS 8,831,654 B2    9/2014   Kim et al.
8,873,483 B2   10/2014   Wu
(Continued)

FOREIGN PATENT DOCUMENTS

KR   1020090055942 A   6/2009
KR   1020110002973 A   1/2011
(Continued)

*Primary Examiner* — Ashley Shivers
(74) *Attorney, Agent, or Firm* — William Park & Associates Ltd.

(57) ABSTRACT

Provided are methods of managing a terminal in a heterogeneous network (HetNet) environment. Between the methods, a method of managing a terminal performed in a base station includes determining whether or not a measurement change request event has occurred, and when a measurement change request event has occurred, transmitting a control message for instructing a change of a measurement operation to the terminal. Accordingly, it is possible to improve a measurement operation and discontinuous reception (DRX) operation control procedure necessary for connection control between one or more base stations and a terminal in a HetNet environment, and thereby performance of a system can be improved.

4 Claims, 9 Drawing Sheets

Related U.S. Application Data division of application No. 14/858,858, filed on Sep. 18, 2015, now Pat. No. 9,775,188, which is a division of application No. 13/782,194, filed on Mar. 1, 2013, now abandoned.

(30) Foreign Application Priority Data

| | | | |
|---|---|---|---|
| Mar. 22, 2012 | (KR) | .................. | 10-2012-0029384 |
| Sep. 7, 2012 | (KR) | .................. | 10-2012-0099251 |
| Sep. 17, 2012 | (KR) | .................. | 10-2012-0102889 |
| Feb. 27, 2013 | (KR) | .................. | 10-2013-0020910 |

(51) Int. Cl.

| | |
|---|---|
| *H04W 48/08* | (2009.01) |
| *H04W 76/20* | (2018.01) |
| *H04W 68/02* | (2009.01) |
| *H04W 24/02* | (2009.01) |
| *H04W 48/16* | (2009.01) |
| *H04W 36/00* | (2009.01) |
| *H04W 76/36* | (2018.01) |
| *H04W 76/15* | (2018.01) |
| *H04W 76/11* | (2018.01) |
| *H04W 24/10* | (2009.01) |
| *H04L 5/00* | (2006.01) |
| *H04W 76/14* | (2018.01) |

(52) U.S. Cl.
CPC ....... *H04W 36/0022* (2013.01); *H04W 48/04* (2013.01); *H04W 48/08* (2013.01); *H04W 48/16* (2013.01); *H04W 68/02* (2013.01); *H04W 76/11* (2018.02); *H04W 76/15* (2018.02); *H04W 76/20* (2018.02); *H04W 76/36* (2018.02); *H04W 76/14* (2018.02)

(58) Field of Classification Search
CPC ......... H04W 36/0005; H04W 36/0011; H04W 36/0016; H04W 36/0022; H04W 36/0055; H04W 36/00837; H04W 68/02; H04W 68/005; H04W 76/28
See application file for complete search history.

(56) References Cited

U.S. PATENT DOCUMENTS

| | | |
|---|---|---|
| 2008/0101268 A1 | 5/2008 | Sammour et al. |
| 2008/0188220 A1 | 8/2008 | DiGirolamo et al. |
| 2008/0293439 A1 | 11/2008 | Hus et al. |
| 2009/0046641 A1 | 2/2009 | Wang et al. |
| 2009/0175186 A1* | 7/2009 | Du .................. H04W 76/28 370/252 |
| 2009/0318170 A1 | 12/2009 | Lee et al. |
| 2010/0130137 A1 | 5/2010 | Pelletier et al. |
| 2010/0272050 A1 | 10/2010 | Lim et al. |
| 2011/0134774 A1 | 6/2011 | Pelletier et al. |
| 2011/0299483 A1 | 12/2011 | Wu |
| 2012/0077509 A1 | 3/2012 | Huang |
| 2012/0106424 A1 | 5/2012 | Davies et al. |
| 2012/0157140 A1 | 6/2012 | Kim et al. |
| 2013/0005340 A1 | 1/2013 | Drazynski et al. |
| 2013/0084849 A1 | 4/2013 | Koskinen et al. |
| 2013/0229931 A1 | 9/2013 | Kim |
| 2014/0051454 A1 | 2/2014 | Wirtanen et al. |
| 2014/0148174 A1 | 5/2014 | Teyeb et al. |
| 2014/0194125 A1* | 7/2014 | Wen .................. H04W 36/0088 455/437 |

FOREIGN PATENT DOCUMENTS

| | | |
|---|---|---|
| KR | 1020110013230 A | 2/2011 |
| KR | 1020110132999 A | 12/2011 |
| KR | 1020120016583 A | 2/2012 |

* cited by examiner

METHODS OF MANAGING TERMINAL PERFORMED IN BASE STATION AND TERMINAL

CLAIM FOR PRIORITY

This application is a divisional application of U.S. patent application Ser. No. 15/683,297, filed on Aug. 22, 2017, which is a divisional application of U.S. patent application Ser. No. 14/858,858, filed on Sep. 18, 2015, which is a divisional application of U.S. patent application Ser. No. 13/782,194, filed on Mar. 1, 2013, and claims priority to Korean Patent Application No. 10-2012-0021843 filed on Mar. 2, 2012, No. 10-2012-0027389 filed on Mar. 16, 2012, No. 10-2012-0029384 filed on Mar. 22, 2012, No. 10-2012-0099251 filed on Sep. 7, 2012, No. 10-2012-0102889 filed on Sep. 17, 2012, and No. 10-2013-0020910 filed on Feb. 27, 2013 in the Korean Intellectual Property Office (KIPO), the entire contents of which are hereby incorporated by reference.

BACKGROUND

1. Technical Field

Example embodiments of the present invention relate in general to technology for a packet-based mobile communication system, and more particularly, to methods of managing a terminal performed in a base station and the terminal to support mobility management and low-power operation of the terminal in a heterogeneous network (HetNet) environment.

2. Related Art

In a packet-based cellular mobile communication system, mobility management is intended to maintain continuity of a connection of a radio bearer (RB), which is a logical channel established between a base station and a terminal.

A general mobility management method uses a backward handover procedure in which a terminal establishes a connection for a control channel through preliminary information exchange between a source base station from which the terminal has originally received service and a target base station that will provide the service through a new connection according to movement of the terminal, accesses the target base station to set a connection for a data channel, and then closes a connection with the source base station.

In particular, in a HetNet environment in which various types of base stations, cells or transmission points such as macro base stations, micro or pico base stations, home base stations, closed subscriber group (CSG) cells or remote radio heads (RRHs) coexist, ping-pong handover frequently occurs between adjacent base stations/cells, and load of a system increases. Also, the quality of a radio channel deteriorates due to interference at a cell boundary, and radio link failure (RLF) occurs due to the deterioration, so that the overall performance of a mobile communication system is hindered.

To improve performance of a mobile communication system, there is a necessity for a method capable of reducing signaling overhead caused by message transmission or state switching (e.g., switches between a connected state and an idle state) of terminals, which are smart phones intermittently generating a small amount of data such as instant message (IM) traffic, machine type communication (MTC) terminals generating traffic such as smart metering data, or terminals generating a small amount of data at long intervals, and minimizing power consumption of the terminals.

Terminals supporting a device-to-device (D2D) communication function are required to perform a measurement for checking whether or not there are adjacent terminals and whether or not it is possible to communicate, and thus it is necessary to improve a measurement procedure such as measurement setup, measurement execution, and measurement reporting for D2D communication, and a method and a control procedure for measurement triggering.

Meanwhile, to improve performance of a terminal located at a cell boundary in a packet-based cellular mobile communication system, a coordinated multipoint transmission and reception (CoMP) function in which a plurality of base stations, cells or transmission nodes located at geographically the same point or different points cooperate to provide service is taken into consideration. CoMP may be classified as a CoMP function provided by one or more micro base stations in a macro base station having a relatively large arbitrary service area, a CoMP function provided by two or ore macro base stations, a CoMP function provided by two or more macro base stations and micro base stations belonging to the macro base stations, and so on.

In addition, CoMP functions may be classified into a joint processing (JP) scheme in which a plurality of transmission nodes transmit the same packet information all together, and a coordinated scheduling/beamforming (CS/CB) scheme in which a plurality of transmission nodes cooperate to support minimization of interference at one transmission node.

According to the JP scheme, in general, a plurality of transmission nodes transmit the same information using the same radio resources (which means that radio resources consisting of the same frequency band and transmission time are allocated to a CoMP-target terminal) and the same modulation and coding scheme (MCS).

The CS/CB scheme is a control method in which a plurality of transmission nodes share radio resources and information for MCS to transmit data to an arbitrary terminal using optimal radio resources and MCS, and exchange related information (e.g, the magnitude of an interference signal, the magnitudes of a signal from a serving cell and a signal of an adjacent cell, optimal transmission and coding information such as a pre-coding matrix indicator (PMI) in consideration of the adjacent cell) so that provision of service and allocation of radio resources can be made through interference control.

The JP scheme may be classified into a joint transmission (JT) scheme in view of a downlink from a base station to a terminal, and a joint reception (JR) scheme in view of an uplink from a terminal to a base station. Also, the JP scheme may include a dynamic cell selection (DCS) method or a dynamic point selection (DPS) method of dynamically selecting transmission nodes participating in CoMP.

The DCS/DPS method is intended to select an optimal point (or cell) at an arbitrary transmission time from among a plurality of cells or points set to participate in CoMP in consideration of radio channel quality, the load statuses of base stations, transmission/reception power and an interference state between a terminal and the base stations, etc., thereby improving performance.

In order to improve performance of a mobile communication system in a HetNet environment supporting a CoMP function in which a plurality of base stations cooperate to provide service as described above and a carrier aggregation (CA) function, it is necessary to improve a measurement operation required for connection control between one or more base stations and a terminal, and a discontinuous reception (DRX) operation control procedure. In addition, to improve the performance of the system, it is necessary to improve a mobility control procedure of a terminal, a measurement method for an MTC terminal, a terminal generating traffic having a variety of profiles, and a terminal supporting the D2D communication function, and a control procedure for minimizing power consumption of a terminal.

SUMMARY

Accordingly, example embodiments of the present invention are provided to substantially obviate one or more problems due to limitations and disadvantages of the related art.

Example embodiments of the present invention provide a method of managing a terminal in a heterogeneous network (HetNet) environment capable of improving performance of a mobile communication system, efficiently controlling interference, ensuring continuity of service, and reducing power consumption of a terminal.

In some example embodiments, a method of managing a terminal in a HetNet environment is a method of managing a terminal performed in a base station, the method including: determining whether or not to control measurement of the terminal; generating measurement information for measurement of the terminal on the basis of the determination of whether or not to control measurement; and providing the generated measurement information to the terminal using a control message.

Here, determining whether or not to control measurement of the terminal may include determining which one among a connection state, an idle state and a limited connection state the terminal is placed in, determining whether or not a carrier aggregation (CA) service is provided to the terminal, determining information or request content received from the terminal, determining a mobility state of the terminal, or determining a type of the terminal as a condition for determining whether or not to control measurement of the terminal.

Here, generating the measurement information for measurement of the terminal may include generating the measurement information causing at least one of channel state information (CSI) measurement, radio resource management (RRM) measurement, measurement for discovering a device-to-device (D2D) terminal, and measurement for D2D communication to be performed.

Here, generating the measurement information for measurement of the terminal may include setting CSI measurement, RRM measurement, measurement for discovering a D2D terminal, and measurement for D2D communication differently according to frequency, or may set the measurement information differently according to cell.

Here, generating the measurement information for measurement of the terminal may include generating at least one piece of measurement information among a measurement-target device, a measurement-target parameter, a measurement period, a measurement reporting period, and conditions for entering and releasing a measurement event.

Here, generating the measurement information for measurement of the terminal may include generating the measurement information by associating a measurement reporting period of the terminal with a discontinuous reception (DRX) operation period of the terminal.

Here, determining whether or not to control measurement may include determining whether or not at least one condition for changing operation of the terminal is satisfied among a case in which there is no data exchange with the terminal for a predetermined first time, a case in which no measurement-related event occurs for a predetermined second time, a case in which a variance of a measurement reporting value for a predetermined third time is in a predetermined range, a case in which it is determined that mobility management of the terminal is not necessary, a case in which the terminal requests a change according to a manual setting by a user, and a case in which a measurement reporting value provided by the terminal satisfies a predefined reference value.

Here, generating the measurement information may include, when at least one t condition for changing operation of the terminal is satisfied, generating the measurement information for instructing the terminal to perform at least one of a measurement and measurement reporting operation switch, a change of measurement and measurement reporting parameters, a DRX operation switch, and a change of a DRX operation parameter.

Here, determining whether or not to control measurement of the terminal may include receiving operation level information defining operation of the terminal from the terminal. Also, generating the measurement information may include setting a parameter for at least one of a measurement operation and a DRX operation of the terminal on the basis of the received operation level information on the terminal.

Here, the operation level information on the terminal may indicate at least one of a first measurement mode in which the terminal performs measurement and measurement reporting operations according to a set measurement parameter, a second measurement mode in which the terminal performs minimum measurement and measurement reporting operations while satisfying the lowest service quality of a set radio bearer (RB), a third measurement mode in which the terminal selectively performs a measurement operation, a first DRX mode in which the terminal performs no DRX operation, a second DRX mode in which the terminal performs a DRX operation according to a set DRX parameter, and a third DRX mode in which the terminal performs a DRX operation to minimize power consumption of the terminal.

In other example embodiments, a method of managing a terminal in a HetNet environment is a method of managing a terminal performed in the terminal, the method including: determining whether or not a measurement change request event has occurred; and when a measurement change request event has occurred, transmitting a message for requesting a change of a measurement operation to a base station.

Here, determining whether or not a measurement change request event occurs may include determining that a measurement change request event has occurred when at least one case occurs among a case in which a user of the terminal has changed a setting, a case in which a set timer has been expired, and a case in which an event based on mobility state estimation (MSE) has occurred.

Here, it may be determined that the event based on MSE has occurred when an intensity of a signal transmitted from the base station is lower than a predetermined threshold value, or when the terminal is determined to have moved out of a specific area on the basis of location information on the terminal.

Here, transmitting the message for requesting a change of a measurement operation to the base station may include transmitting the request message for requesting stop of measurement and measurement reporting, restart of measurement and measurement reporting, or a change of a measurement parameter.

Here, transmitting the message for requesting a change of a measurement operation to the base station may include transmitting operation level information defining operation of the terminal to the base station.

Here, the operation level information may be information defining an operation level of measurement and measurement reporting of the terminal, or a DRX operation level of the terminal.

Here, the operation level information on measurement and measurement reporting of the terminal may include at least one piece of information among measurement operation activation/deactivation information, threshold values for conditions for entering and releasing a measurement event, a threshold value of a timer for measurement management, a measurement event-triggering threshold value, an adjustment value for adjusting measurement event triggering, a timer value for triggering execution of measurement or measurement reporting, a measurement period, a measurement reporting period, a measurement-target frequency, and a type of a measurement-target cell.

Here, the information defining the DRX operation level of the terminal may include at to least one piece of information among a DRX period, a section for monitoring control information, a timer for a DRX operation, and activation/deactivation information on the DRX operation.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS OF THE PRESENT INVENTION

Figure 1:
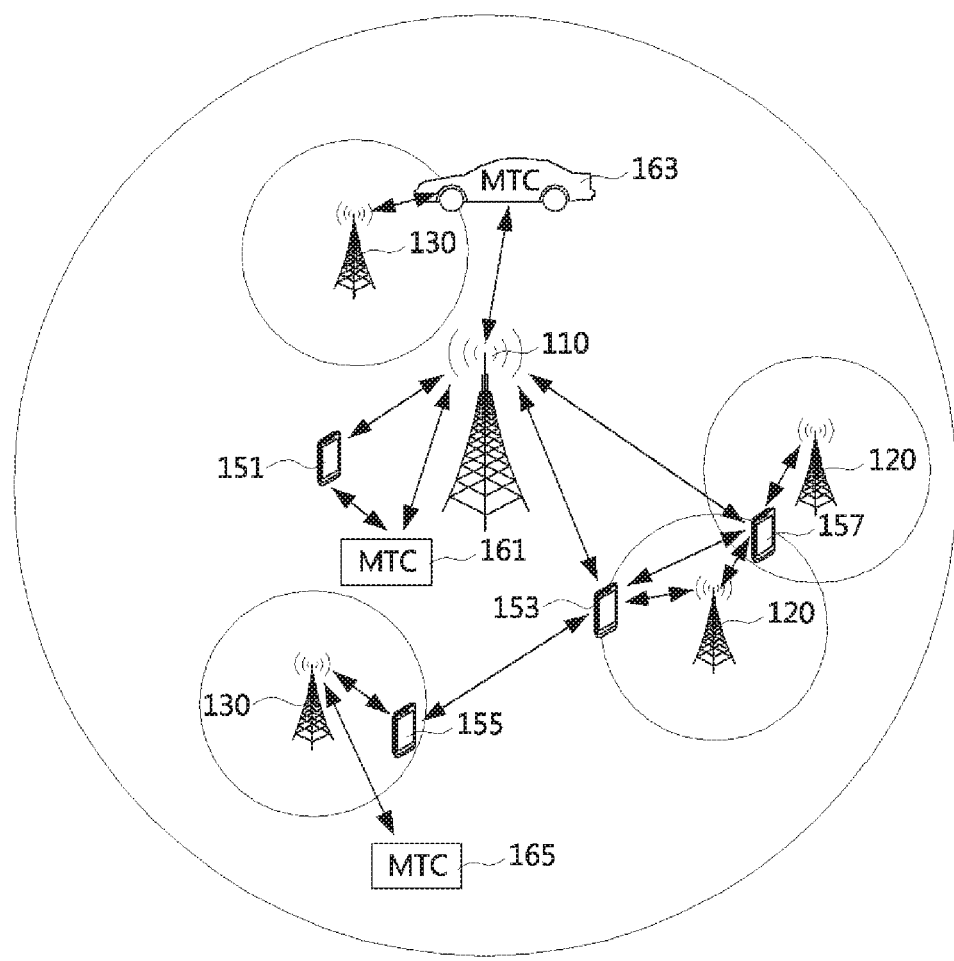
FIG. 1 is a conceptual diagram showing an example of a heterogeneous network (HetNet) to which a method of managing a terminal according to example embodiments of the present invention is applied.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims. Elements of the example embodiments are consistently denoted by the same reference numerals throughout the drawings and detailed description.

It will be understood that, although the terms first, second, A, B, etc. may be used herein in reference to elements of the invention, such elements should not be construed as limited by these terms. For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.), The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpretered as is customary in the art to which this invention belongs. It will be further understood that terms in common usage should also be interpreted as is customary in the relevant art and not in an idealized or overly formal sense unless expressly so defined herein.

Hereinafter, example embodiments of the present invention will be described in detail with reference to the appended drawings. To aid in understanding the present invention, like w numbers refer to like elements throughout the description of the drawings, and the description of the same component will not be reiterated.

In example embodiments of the present invention that will be described below, a node or a point may denote one of a base station, a macro base station, a micro base station, a NodeB, an evolved Node-B (eNodeB), a cell, a femto cell, a femto base station, a home cell, a home (e)NB, a remote wireless node, a remote radio head (RRH), a closed subscriber group (CSG) cell, and a relay in a mobile communication system. Even when no additional description is made, in a coordinated multipoint transmission and reception (CoMP) operation according to example embodiments of the present invention, each node or point denotes a transmission node or a transmission point from the viewpoint of a downlink (i.e., a terminal receives a signal), and denotes a reception node or a reception point from the viewpoint of an uplink (i.e., a terminal transmits a signal).

A method of managing a terminal in a heterogeneous network (HetNet) environment according to example embodiments of the present invention provides a CoMP function, in which a plurality of base stations present at geographically adjacent locations or different locations cooperate to provide service, and service to various types of terminals such as a machine type communication (MTC) terminal or a smart phone in a HetNet environment in which a macro base station and various types of micro base stations coexist, provides a measurement opportunity for a serving base station, an adjacent base station or surrounding terminal devices in an environment supporting direct communication between the terminals, and provides a parameter for managing mobility of a terminal and supporting a low-power consumption operation, thereby increasing a transmission rate of a mobile communication system, improving interference control or interference avoidance performance, ensuring continuity of the service, and reducing power consumption of a terminal.

FIG. 1 is a conceptual diagram showing an example of a HetNet to which a method of managing a terminal according to example embodiments of the present invention is applied, w and illustrates a constitution of an intra-evolved universal terrestrial radio access network (UTRAN) node B (eNB) environment and a service scenario of a terminal in a HetNet environment.

Referring to FIG. 1, a HetNet may include a macro base station (or eNB) 110, a plurality of micro base stations 120, and a plurality of remote wireless nodes 130, and may provide service to terminals, such as user terminals 151, 153, 155 and 157 and MTC terminals 161, 163 and 165, supporting a variety of functions, In a service area of the macro base station 110, one or more micro base stations 120 and one or more remote wireless nodes 130 may be present. According to a constitution of a network, the one or more micro base stations 120 or the one or more remote wireless nodes 130 may be configured to have the same cell identifier (ID) as the macro base station 110, or configured to operate using respective cell IDs different from the cell ID of the macro base station 110.

Even when at least one micro base station 120 or at least one remote wireless node 130 is configured to have the same cell ID as the macro base station 110, it is necessary to identify the micro base station 120 or the remote wireless node 130 for a dynamic cell selection (DCS)/dynamic point selection (DPS) operation, interference control between the remote wireless nodes 130, or configuration and distinguishment of feedback information from a terminal. Thus, additional IDs may be applied to the micro base stations 120 or the remote wireless nodes 130, or reference symbol (RS) patterns for distinguishment between the micro base station 120 and the remote wireless node 130, patterns for a pilot symbol, or scramble signal patterns may be applied. For example, different patterns may be applied to the micro base stations 120 or the remote wireless nodes 130 using transmission locations of the corresponding symbols or signals, a transmission frequency band, a transmission interval or period, a transmission repetition period, a masking signal sequence, or so on.

In the HetNet environment in which the macro base station 110, the micro base to stations 120 and the remote wireless nodes 130 coexist, terminals may exchange packet information with one point, or exchange data with a plurality of points. Here, a point denotes one of the macro base station 110, the micro base stations 120 and the remote wireless nodes 130, and may operate as a transmission point, a reception point, a transmission and reception point, etc. according to connection management and a parameter setting for forwarding packet information.

For example, there may be the user terminal 151 that establishes a logical connection (e.g., a radio resource control (RRC) connection of a Long Term Evolution (LTE) system) with the macro base station 110 and exchanges packet information in the HetNet environment. In addition, there may be the user terminal 155 that establishes a connection with the macro base station 110 and exchanges packet information via a remote wireless node 130. Furthermore, there may be the user terminal 153 that transmits or receives packet information via two points consisting of the macro base station 110 and a micro base station 120 using the CoMP function, and the user terminal 157 that transmits or receives packet information via two micro base stations 120 or two remote wireless nodes 130.

In the intra-eNB environment as shown in FIG. 1, a user terminal basically performs control and management for connection setup with the macro base station 110 or a primary transmission node having a layer 3 function (e.g., the RRC layer of the LTE system) that handles control over a connection of a radio bearer (RB) regardless of the locations or number of points transmitting or receiving packet information.

Meanwhile, the user terminal 153 may wirelessly transmit and receive data directly to and from the adjacent user terminal 157 using a device-to-device (D2D) communication function, and receive control information related to D2D communication from the macro base station 110 or the micro base station 120 in case of necessity. Here, the control information related to D2D communication may include, for example, information on radio resources (radio subframe configuration information, modulation and coding scheme (MCS) w information, information on an allocated frequency band and transmission timing, and so on) used for D2D communication, information for discovering an adjacent terminal (discover channel information), setup information and a parameter for measuring an adjacent terminal, and so on.

The MTC terminal 163 that is installed in a car or supports a mobility function may receive service including control of the mobility function, execution of measurement, setup of a parameter for a control function, and data transmission via a remote wireless node 130 or the macro base station 110. Here, the MTC terminal 161 may be capable of direct communication with the user terminal 151 as well as the macro base station 110 using the D2D communication function. Such D2D communication between the MTC terminal 161 and the user terminal 151 may be limitedly performed only when a user sets D2D communication in advance.

The MTC terminal 165 may be configured to access the adjacent remote wireless node 130 rather than the macro base station 110 so as to reduce power consumption of the terminal. Also, the MTC terminal 165 may be configured to receive service via the adjacent user terminals 153 and 155 using the D2D communication function or receive service by directly accessing the macro base station 110 when it is not possible to receive service via the adjacent remote wireless node 130 because of deactivation or disabling of the remote wireless node 130, barring, or other reasons.

Figure 2:
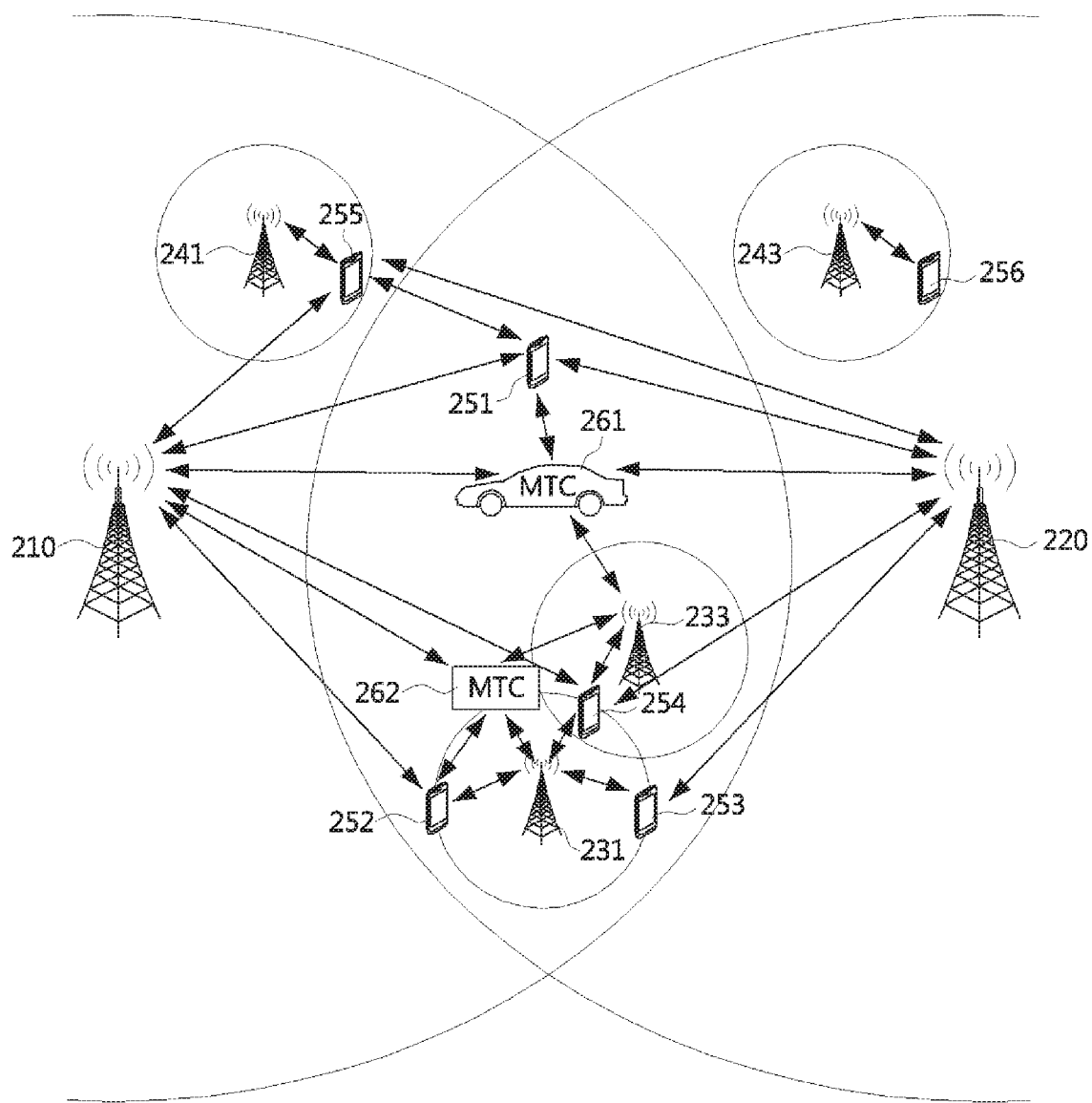
FIG. 2 is a conceptual diagram showing another example of a HetNet to which a method of managing a terminal according to example embodiments of the present invention is applied.

FIG. 2 is a conceptual diagram showing another example of a HetNet to which a method of managing a terminal according to example embodiments of the present invention is applied, and illustrates a constitution of an inter-eNB environment and a service scenario of a terminal in a HetNet environment.

Referring to FIG. 2, a HetNet may include a plurality of macro base stations (or eNBs) 210 and 220, a plurality of micro base stations 231 and 233, and a plurality of remote wireless nodes 241 and 243, and may provide service to terminals, such as user terminals 251 to 256 and MTC terminals 261 and 262, supporting a variety of functions.

In the inter-eNB environment shown in FIG. 2, the respective macro base stations 210 and 220 perform connection control on the user terminals 251 to 256 and the MTC terminals 261 and 262 belonging to the service areas of the respective macro base stations 210 and 220.

However, when the CoMP function is supported for the user terminal 251 located at a boundary point between the service areas of the respective macro base stations 210 and 220, the user terminal 254 located at a boundary point between points such as micro base stations or remote wireless nodes managed by the respective macro base stations 210 and 220, or the user terminals 252, 253 and 255 present at boundary points between points managed by the respective macro base stations 210 and 220 and another eNB, the two macro base stations 210 and 220 may exchange control information to determine a macro base station that will primarily perform connection control together with points to participate in a CoMP operation, The determined primary macro base station (primary eNB) may set a control parameter, set or allocate a radio control channel for transmitting control signaling information such as control information and feedback information, and perform connection control such as connection establishment/maintenance/change of an RB for data transmission, a signaling RB for transmitting signaling information, or so on. Also, the primary macro base station primarily determines and performs procedures such as measurement and reporting of points for the CoMP operation, resource allocation and scheduling (including generation and transmission of physical downlink control channel (PDCCH) information, configuration of feedback information, and so on), and control of an RB connection. Meanwhile, the MTC terminal 261 that is located at a boundary point between the service areas of the two macro base stations 210 and 220 and has the mobility function or is installed in a car (including a case of only having an interface for connecting a terminal) may receive necessary service using the two macro base stations 210 and 220 or the adjacent micro base station 233 on the basis of the user terminal 251, or exchange data with the to adjacent user terminal 251 through a radio channel using the D2D communication function.

The MTC terminal 262 located at a boundary point between points such as the micro base stations 231 and 233 or remote wireless nodes managed by the respective macro base stations 210 and 220 may access the closer macro base station 210 among the adjacent micro base stations (or remote wireless nodes) 231 and 233 and the two macro base stations 210 and 220 on the basis of the user terminal 254 and exchange data. Alternatively, the MTC terminal 262 may exchange data with the adjacent user terminal 252 through a radio channel using the D2D communication function according to a setting of the network or the terminal.

When the HetNet environment described with reference to FIG. 1 and FIG. 2 is configured as a Third Generation Partnership Project (3GPP)-based mobile communication system, a macro base station denotes an (e)NB or a macro (e)NB, and a remote wireless node may denote a wireless transmission node having only some functions of radio protocol layer 3 (e.g., the RRC layer of an LTE system), such as a macro or micro base station, and radio protocol layer 2 (the radio link control (RLC)/media access control (MAC) layer of an LTE system), or having functions of a radio frequency (RF) module including an antenna such as an RRH or some functions of a baseband region.

A micro base station shown in FIG. 1 and FIG. 2 may denote a micro cell or a pico cell that has radio protocol functions including the same radio resource allocation function as an (e)NB or a macro base station and a function of the RRC layer and the RLC/MAC layer for managing connection control for an RB set between a base station and a terminal, but has a small service area due to relatively low transmission power, or denote a femto cell, a home cell (home (e)NB), or a CSG cell.

In a HetNet environment in which various types of base stations, such as a macro base station, a micro base station, a remote wireless node, a home base station and a CSG cell, and a variety of terminals, such as an MTC terminal, a smart phone, and a general cellular phone other than a smart phone, coexist, a base station that will primarily perform connection control, such as measurement/measurement reporting about whether or not a CoMP function is supported under management of the network, whether or not the D2D communication function is supported, the type of service that is being provided, or a terminal, parameter setup for a discontinuous reception (DRX) operation, and so on.

The determined primary base station performs connection control such as connection establishment/maintenance/change of an RB for data transmission necessary for providing service, a signaling RB for transmitting signaling information, or so on.

In addition, the primary base station allocates a physical control channel for transmitting control signaling information (resource allocation information for scheduling, feedback information, and so on), and may perform a function of setting various measurement functions, such as measurement for reporting a channel quality indication (CQI) for determining an MCS level according to a radio channel state, measurement of a serving cell and adjacent cells for supporting the mobility function, measurement for searching for or discovering an adjacent terminal (e.g., a user terminal or an MTC terminal) for supporting the D2D communication function, etc. according to frequency or cell.

Furthermore, the primary base station may control only some of the various measurement functions to be activated or enabled, or a measurement function to be deactivated or disabled. A setting of functions of such measurement operations (execution of measurement and measurement reporting) and the DRX operation may be determined according to information acquired by the base station and a mechanism, or determined by the primary base station with reference to a request of a terminal (information bits indicating a value and a range of a component parameter, activation/deactivation of a function, or a combination of functions).

As mentioned above, functions of a measurement operation may be classified as described below Channel state information (CSI) measurement: As measurement for CQI reporting, this is a measurement and measurement reporting operation for ensuring transmission reliability in a wireless section, such as an MCS level and a retransmission scheme of a hybrid automatic repeat request (HARQ), etc., upon data transmission.

Radio resource management (RRM) measurement: this is a measurement and measurement reporting function for supporting the mobility function, and in RRM is measurement, a measurement and measurement reporting operation is performed on a serving cell and adjacent cells (having the same frequency as the serving cell or a different frequency than the serving cell), events for measurement of a serving cell, an adjacent cell having the same frequency, an adjacent cell having a different frequency, and a different type of base station may be separately set, and entry/release of each event may be set and controlled using a reference value (or threshold value) for a measurement parameter and reference timer information.

D2D discovery measurement: As measurement for discovering an adjacent terminal to support the D2D communication function, this is a measurement and measurement reporting operation performed to check whether or not a terminal is present in a radio channel environment regardless of whether or not information received from a base station or location information is used.

D2D communication measurement: this is a measurement and measurement reporting operation for estimating the quality of a radio channel between terminals to exchange actual data between the terminals using the D2D communication function, and for ensuring transmission reliability in a wireless section, such as an MCS level and a retransmission scheme of a HARQ, etc., on the basis of radio channel quality estimated upon data transmission.

When a terminal initially accesses a mobile communication network, or before the terminal closes access to the network, the network may limitedly set a type of a base station (a macro base station, a micro base station, a remote wireless node, a CSG cell, a home base to station, and so on) which the terminal will primarily access in consideration of a capability of the terminal using control signaling information transmitted by the base station or initial (or basic) setup information on the terminal.

According to a state of a terminal among a connected state in which the terminal is establishing/maintaining a logical connection with an arbitrary base station for service or control signaling, an idle state in which no logical connection has been established between the terminal and a base station, and a state in which the terminal has no logical connection with a base station for service or control signaling but is maintaining a limited connection (e.g., a connection that is only valid in a situation satisfying limited conditions or for an arbitrary time section (or period)), respective measurement operations such as the above-described CSI measurement, RRM measurement, D2D discovery measurement, and D2D communication measurement may be selectively set, or some of the measurement operations may be set as a combination.

When a base station supports a carrier aggregation (CA) function using a plurality of frequencies, a measurement operation of a terminal may be set differently according to each of the frequencies. In other words, whether to activate or deactivate each measurement operation to be performed by the terminal, and a setting of a measurement parameter may vary according to frequency.

For example, when a macro base stations uses frequencies f1, f2 and f3 and a micro base stations uses frequencies f1 and f3 in a HetNet environment, a terminal supporting the CA or CoMP function may receive service from the macro base station and (or) the micro base station using the CA function or the CoMP function based on the frequencies f1 and f3. At this time, for CA, the terminal that receives service from the macro base station (or the micro base station) using the CA function in the connected state may perform a measurement operation on a frequency (e.g., f1) of the primary base station (primary cell (Pcell)) and a frequency (e.g., f2 or f3) of a secondary base station (secondary cell (Scell)).

Meanwhile, a primary base station of a terminal may separately set a CSI measurement operation for scheduling resource allocation and an RRM measurement operation for mobility management. For example, RRM measurement and CSI measurement may be set to be performed together on a frequency of the primary base station, and only CSI measurement may be set to be performed on a frequency of a secondary base station.

In case of need or according to a request of a terminal, a primary base station may control the RRM or CSI measurement operation to be placed in an activation or deactivation mode. For example. RRM measurement of a frequency of a primary base station may be activated to be performed, and CSI measurement of the frequency of the primary base station or a frequency of a secondary base station may be deactivated to be stopped.

Using a request of a terminal, information received from the terminal, etc., a base station may control RRM measurement of a frequency of a primary base station to be stopped (deactivated) in case of need. In particular, when a terminal accesses a micro base station and receives service, a base station reduces as many measurement operations of the terminal for mobility management as possible by deactivating RRM measurement and only activating CSI measurement using mobility state estimation (MSE) information on the terminal or according to a request (or a manual setting by a user) from a terminal determined to have almost no mobility, and thereby may control power consumption of the terminal to be reduced. Such a method of controlling the respective CSI, RRM, D2D discovery and D2D communication measurement operations to be activated or deactivated according to MSE information on a terminal may be applied regardless of a type of a base station that the terminal has accessed, and the respective measurement operations may be controlled according to a request of the terminal or a determination of the base station.

In particular, a fixed MTC device (e.g., an MTC device for metering) having no mobility may be basically controlled to deactivate the RRM measurement operation and operate. Also, a fixed MTC device may be configured to deactivate CSI measurement as well and perform transmission using a predetermined MCS.

For example, when a fixed MTC device is installed or registered with a network, operations and procedures for measurement or reporting may be selectively deactivated among the RRM and CSI measurement operations and report operation procedures using a control message (e.g., an RRC message or a MAC message).

Meanwhile, a terminal that maintains a logical connection (e.g., an RRC connection) for service or control signaling between the terminal and a base station performs a measurement on a serving base station and an adjacent base station (which uses the same frequency as the serving base station or a frequency adjacent to that of the serving base station) to support the mobility function. After performing the measurement according to a measurement target (e.g., a frequency or a measurement signal) set through a control message by the base station and a measurement report parameter, the terminal reports the measurement results to the base station. Here, the measurement signal may be a pilot symbol or a reference signal (RS) that is periodically transmitted on a physical channel. For example, the measurement signal may be configured as a cell-specific RS (CRS), a CSI-RS, an RRH-RS (RS defined to identify an RRH), a user equipment (UE)-specific RS (RS defined to identify a terminal), and so on, and may be defined by the frequency of occurrence on a time axis (e.g., a subframe interval and the number of transmission subframes), the position of occurrence on a frequency axis (e.g., a subcarrier interval and the number of transmission subcarriers), the number of RS symbols, etc. in consideration of the number of antennas.

A base station notifies a terminal of a measurement-target base station (or measurement-target frequency), a measurement-target parameter, a measurement period, a measurement reporting period, and parameters of conditions for entering and releasing a measurement event using a control message, and the terminal performs measurement according to the measurement-related parameters provided by the base station, and reports the measurement results.

To set a parameter for a measurement operation of a terminal, a base station may display a measurement-target base station using a base station ID, and a measurement-target frequency using a frequency index (or ID) defined in a system. The results measured by the terminal may be expressed as RS received power (RSRP), RS received quality (RSRQ), a received signal strength indicator (RSSI), CSI field information. CQI field information, or so on.

Also, to set conditions for entering and releasing a measurement event, a base station may use a reference value for a measurement target, a threshold value or offset value, a threshold value of at least one timer for measurement management, a measurement event-triggering threshold value or an adjustment value related to measurement event triggering, a tinier value for triggering execution of measurement or measurement reporting, etc. according to each measurement operation.

When measurement and measurement reporting are periodic, a base station may set a measurement period and a measurement reporting period in units of subframes, radio frames, milliseconds (ms), or seconds sec. Here, the base station may improve performance of the DRX operation by aligning the measurement reporting period and a multiple of a DRX operation period with each other. When a condition for entering and/or releasing a measurement event for mobility management is satisfied, the measurement period and the measurement reporting period may be set to be a periodic regardless of a set measurement period or measurement reporting period, so that measurement and/or measurement reporting is performed when an event occurs.

For efficiency of operation, a base station may close an RRC connection of a terminal in an RRC connection state in which the DRX operation and a measurement operation for measurement and measurement reporting are necessary, and control the terminal to switch to the idle state when there is no data exchange between the base station and the terminal for a predetermined time or the base station determines that the RRC connection is not necessary. As mentioned above, a base station may selectively deactivate respective measurement operations and the DRX operation performed by a terminal without switching the terminal to the idle state using a request from the terminal or a measurement report provided by the terminal, or may change measurement and DRX operation levels or related parameters, thereby controlling the terminal to reduce power consumption. Such a control may be determined by the base station in consideration of a request from the terminal (or a manual setting by a user), information collected from the terminal, a load status of the base station, or so on.

For example, to avoid overload of a signaling procedure required for a terminal having switched from the connected state to the idle state to switch from the idle state to the RRC connection state due to generation of new data, an update of a base station (cell update), an update or measurement report (self optimization network (SON)/minimization driving test (MDT) measurement information and location information) of a routing area/local area, etc., the base station may deactivate the DRX operation and a measurement/measurement reporting operation or change related parameters, thereby controlling the terminal to maintain the RRC connection state while minimizing power consumption of the terminal without switching to the idle state.

In other words, to minimize power consumption of a terminal and efficiently use radio resources such as a control channel occupied for measurement reporting, a base station may stop (deactivate) a DRX operation switch (a switch between a non-DRX operation and the DRX operation) and a measurement/measurement reporting operation, or change related parameters when at least one of the following conditions is satisfied:

a case in which there is no data exchange between the base station and the terminal for a predetermined time, a case in which no measurement-related event occurs for a predetermined time, a case in which a variance (or deviation) of a measurement reporting value for a predetermined time is in a predetermined range, a case in which it is determined that mobility management of the terminal is not necessary according to an MSE result of the terminal, a case in which a user requests a change by a manual setting, and a case in which a measurement reporting value satisfies a predefined level (e.g., a threshold value).

According to a predetermined method in addition to the aforementioned conditions, a base station and a terminal may he configured to extend a DRX operation period (e.g., a DRX period or a DRX operation-related timer such as an on-duration timer, an inactivity timer or a retransmission timer) and a measurement/measurement reporting period and operate.

In other words, when at least one of the aforementioned conditions or an additionally set condition is satisfied, a DRX operation period and a measurement/measurement reporting period may be set to he longer than existing periods. To this end, by transmitting a control message to a terminal, a base station may control the terminal to stop (or deactivate) a DRX operation switch and a measurement/ measurement reporting operation, or to extend the DRX operation period and the measurement/measurement reporting period.

To determine stop (deactivation) of measurement reporting or extension of a measurement reporting period as mentioned above, a base station and a terminal may define a timer that defines a time for which the base station and the terminal maintain an RRC connection without exchanging data or a predetermined time section in which no measurement-related event occurs, and variably set the value.

In addition, to determine stop of measurement reporting or extension of a measurement reporting period, a variance (or deviation) of a measurement reporting value reported from a terminal, a measurement report level, a measurement report threshold value, to etc. may be defined, and the values may be set to be variable. Such a timer value, a deviation and a threshold value used as parameters for determining stop of measurement reporting or extension of a measurement reporting period may be set through a control message, and used as a reference for triggering an operation of stopping measurement reporting or extending a measurement reporting period. As the control message that announces information on stop of measurement reporting or extension of a measurement reporting period, or instructs stop of measurement reporting or extension of a measurement reporting period, for example, an RRC control message, a MAC control message (control protocol data unit (PDU)), a physical control channel, etc. may be used.

Meanwhile, a terminal that is instructed to stop measurement reporting or extend a measurement reporting period in such a way as described above may stop a measurement operation or a measurement reporting operation, or perform measurement reporting according to an extended measurement reporting period even when maintaining an RRC connection. However, when a control message announcing data reception is received from a base station, or information to be transmitted from the terminal to the base station is generated while the terminal stops the measurement operation or the measurement reporting operation, or performs the measurement reporting operation according to the extended measurement reporting period, the measurement and measurement reporting operations may be set on the basis of control massages (e.g., "measObjectToAddModList" and "reportConfigToAddModList") of a previously set measurement and measurement reporting period. In other cases, a reset procedure based on the control messages for the measurement and measurement reporting period may be used at a point in time at which data is exchanged again between the base station and the terminal.

In addition to the measurement operation deactivation method as described above, a method in which, when a terminal defines an operation level and reports information on the operation level to a base station, the base station sets parameters for a measurement operation w or the DRX operation according to the operation level reported by the terminal and transmits the parameters to the terminal, and the terminal performs the measurement operation or the DRX operation according to the received parameter may be used as a method for reducing power consumption of a terminal.

For example, when a terminal is supplied with power from the outside such as is recharging, or has a high enough battery level, related parameters may be set without limitation of a measurement operation or the DRX operation. On the other hand, when a battery level of a terminal is not high enough, or there is a request from the terminal (or a setting by a user), parameters related to a measurement operation and the DRX operation may be set, so that the terminal operates with minimum power only. In other words, it is possible to set a terminal to perform different measurement operations and DRX operations according to an operation level of the terminal.

As an operation level of a terminal, measurement operation and DRX operation levels may be separately set, or may be integrated and set as one operation level.

First, when a measurement operation and the DRX operation are separately set, a setting may be made as described below

[Measurement Operation Level]
Normal measurement mode: measurement and report operations are performed according to measurement parameters set to efficiently support service quality or mobility management provided to a terminal.
Power optimization measurement mode: minimum measurement and report operations are performed while the lowest service quality of an RB whose connection has been established is satisfied to enable occurrence of a handover failure (HOF) or a radio link failure (RLF).
Minimum measurement mode: even when all or some operations for RRM measurement or CSI measurement are not selectively set or are selectively set according to cells (e.g., a Pcell, an Scell, and an adjacent cell) or frequencies (the same frequency, a different frequency, a frequency of the same band, a frequency of an adjacent band, and whether or not frequency bands are connected in succession), substantial operations are deactivated.

[DRX Operation Level]
Non-DRX Mode: since a terminal is supplied with power from a charging device, etc., or a battery level is high enough, a low-power consumption operation is not necessary, and no DRX operation is performed.
Normal DRX Mode: the DRX operation is performed according to a DRX parameter set depending on the service quality of an RB whose connection has been established.
Power Optimization DRX Mode: a connection is maintained while the lowest service quality of a set RB is satisfied, and the DRX operation is performed by setting a DRX parameter to minimize power consumption of a terminal.

Meanwhile, when measurement operation and DRX operation levels are not separated but are integrated and set as one operation level, operation level of a terminal may be set as will be described below.

Normal Operation Mode: a terminal operates according to measurement and DRX parameters set to efficiently support service quality or mobility management provided to the terminal.
Power Sub-optimization Mode: a terminal performs an operation of maintaining a connection of an RB established to enable occurrence of an HOF or an RLP while minimizing power consumption of the terminal.
Power Optimization Operation Mode: to minimize power consumption, a terminal selectively limits (does not set or deactivates) all or some of RRM measurement or CSI measurement operations in case of need and operates while satisfying the lowest service quality of a set RB. For example, a terminal operates in a combination mode of the w aforementioned minimum measurement mode for a measurement operation level and the aforementioned power optimization DRX mode for a DRX operation level.

An RRM measurement function for managing mobility of a terminal or a D2D-related measurement function may be configured to be activated or deactivated through a manual setting change by a user, and the terminal may define an additional RRC control message for notifying a base station of information related to the manual setting change by the user. For example, if a user sets an RRM measurement operation in which a terminal performs a measurement of a serving base station, a camping base station or an adjacent base station for mobility management to be deactivated when the user accesses an arbitrary base station and receives service, or the terminal camps on an arbitrary base station in the idle state, the terminal may request such a setting from the base station through a control message, and the base station may approve the setting to deactivate the RRM measurement operation. When an RRM measurement operation of a terminal is deactivated in this way, a base station may control the RRM measurement operation to be activated if it is determined that the terminal has moved, and mobility management is necessary, or there is a manual request of a user. As described above, a D2D-related measurement function may also be activated or deactivated according to a manual setting or request of a user.

Figure 3:
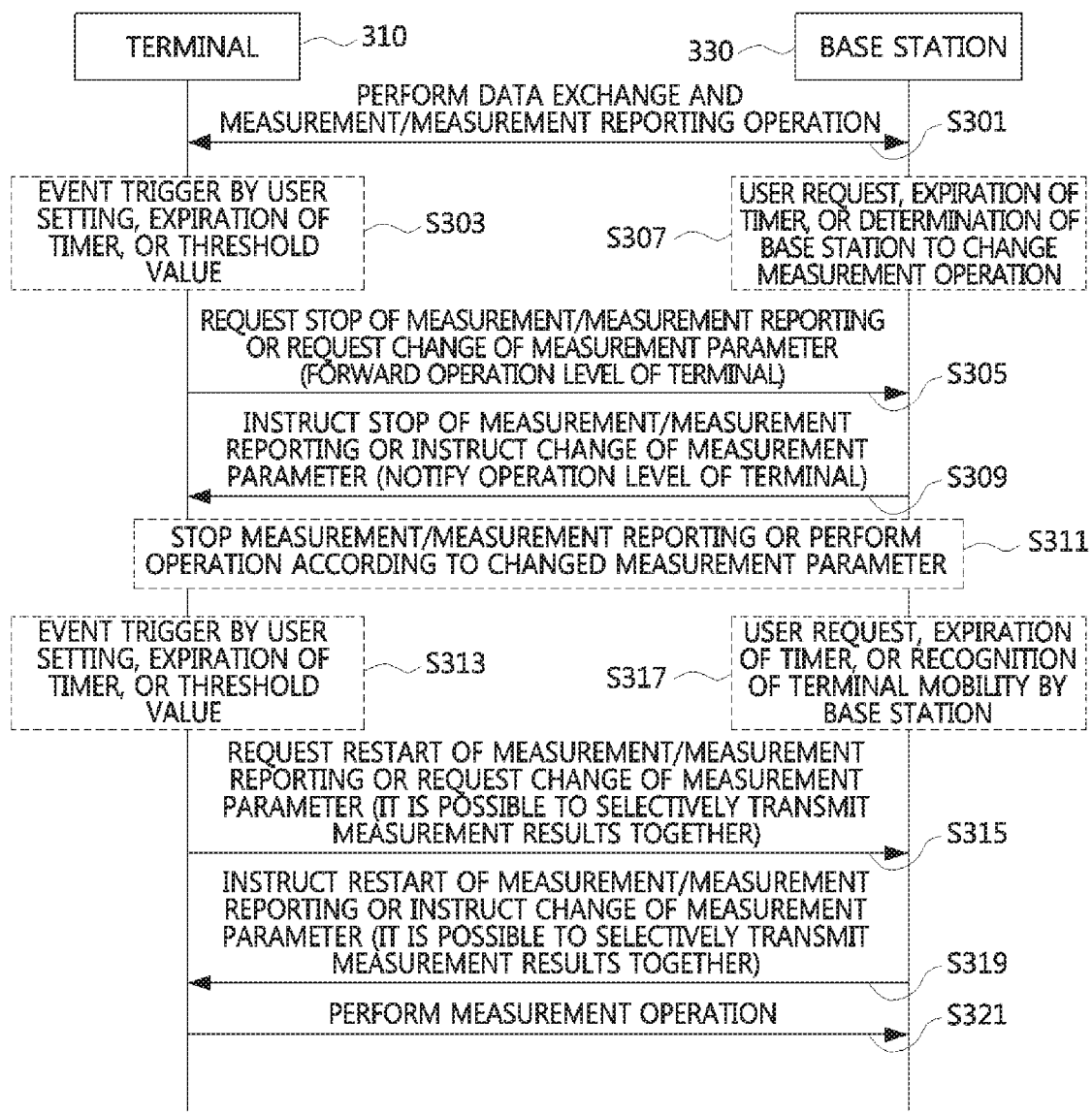
FIG. 3 is a message sequence diagram illustrating a measurement operation determination procedure of a terminal in a method of managing a terminal according to example embodiments of the present invention.

FIG. 3 is a message sequence diagram illustrating a measurement operation determination procedure of a terminal in a method of managing a terminal according to example embodiments of the present invention, that is, a procedure in which a base station 330 and a terminal 310 cooperate to determine whether or not to perform a measurement operation, a measurement operation level, or a measurement-related parameter, Referring to FIG. 3, the terminal 310 first establishes a connection with the base station 330, performs data exchange and a measurement, and reports measurement results to the base station 330 (S301).

When a user manually changes a setting of the terminal 310, a timer managing a remaining time set by the base station 330 expires, or an event trigger based on MSE and a setting of a threshold value is pulled, the terminal 310 may determine to request stop (or deactivation) of measurement reporting or a change of a measurement parameter (S303).

When the user manually changes a setting, or the event trigger is pulled, the terminal 310 transmits a control message for requesting stop of measurement reporting or a change of a measurement parameter to the base station 330 (S305).

In step S305, the terminal 310 may transmit information on a desired operation level of the terminal 310 to the base station 330. An operation level of the terminal 310 may be configured to define an operation level of measurement and measurement reporting, or to define a DRX operation level rather than a measurement operation level. When the operation level of the terminal 310 is operation level information on a measurement operation, the operation level information of the terminal 310 may directly include the aforementioned measurement-related parameters, such as measurement operation-specific threshold values or offset values for conditions for entering and releasing a measurement event, a threshold value of a timer for measurement management, a measurement event-triggering threshold value or a related adjustment (offset) value, a timer value for triggering execution of measurement or measurement reporting, a measurement period, a measurement reporting period or a measurement-target frequency, and a type of a measurement-target cell, as well as measurement operation activation/deactivation information, or operation level parameters expressed as a combination of parameters may be separately defined and included in the operation level information of the terminal 310.

On the other hand, when the operation level information of the terminal 310 is operation level information on the DRX operation of the terminal 310, parameters such as a DRX period, a section (e.g., on-duration period) for monitoring control information, a timer (e.g., a retransmission timer or an inactivity timer) for the DRX operation, activation/deactivation of the DRX operation may be directly included in the operation level information of the terminal 310, or an operation level parameter expressed as a combination of parameters may be separately defined and included in the operation level information of the terminal 310.

The operation level of the terminal 310 may be defined in consideration of a measurement operation and the DRX operation together. In this case, a related control message may selectively include measurement operation or DRX parameters, or an operation level parameter expressed as a combination of parameters may be separately defined and included in the related control message.

Referring back to FIG. 3, the base station 330 determines to stop measurement reporting or change the measurement parameter on the basis of information on the measurement report stop request or the measurement parameter change request (the information on the desired operation level of the terminal 310) received from the terminal 310 in step S305, or determines to stop measurement reporting or change the measurement parameter when the event trigger based on a timer or a threshold value set by the base station 330 itself is pulled (S307).

Subsequently, the base station 330 transmits a control message that instructs the determined stop of measurement/measurement reporting or change of the measurement parameter to the terminal 310 (S309). In step S309, the base station 330 may notify the terminal 310 of the operation level information of the terminal 310 in response to the operation level information of the terminal 310 provided by the terminal 310 in step S305.

The terminal 310 receives the control message that instructs stop of measurement/measurement reporting or a change of the measurement parameter from the base station 330, and performs a measurement operation or stops measurement/measurement reporting according to the received control message (S311).

Meanwhile, when a manual setting is changed by a user, a set timer expires, or the event trigger based on MSE and a setting of a threshold value is pulled while the terminal 310 is stopping measurement/measurement reporting or performing a measurement operation according to the changed measurement parameter, the terminal 310 may determine to request restart (or activation) of measurement/measurement reporting or a change of a measurement parameter (S313).

In step S313, the manual setting by the user may denote, for example, a case in which a timer for stopping measurement/measurement reporting personally set by the user of the terminal 310 expires, or the user personally makes a setting that instructs restart of measurement/measurement reporting while moving from a place at which stop (deactivation) of measurement/measurement reporting has been set.

Also, in step S313, the terminal 310 may use a signal transmitted from a serving cell or location information on the terminal 310 as the event trigger based on MSE and a setting of a threshold value. Here, a case in which the terminal 310 uses the signal of the serving cell denotes an event defined to request restart (activation) of measurement/ measurement reporting or a change of a measurement parameter, for example, when the signal of the serving cell becomes lower than a predetermined reference value. The signal transmitted from the serving cell may be defined to be a CRS, a CSI-RS, a data modulation (DM)-RS (or a UE-specific RS), a positioning RS (PRS), or an RSSI, an RSRP, an RSRP, an RSRQ, a signal-to-interference ratio (SIR), etc. of an RS from which a signal received from other cells (base stations or transmission nodes) can be estimated.

Thus, the event trigger based on MSE and a setting of a threshold value may be configured to recognize that the terminal 310 has left the serving cell, has moved a predetermined distance or more from the center of the serving cell, or has been located in a boundary area of the serving cell using the aforementioned signal transmitted from the serving cell, and transmit a control message for performing measurement or measurement reporting or changing a measurement parameter to the base station 330 when a condition of an event set to request restart (activation) of measurement/measurement reporting or a change of the measurement parameter is satisfied. Here, when the previously set event condition is satisfied, the base station 330 may control or set the terminal 310 to perform a measurement of the serving cell or adjacent cells independently of transmission of the control message from the terminal 310 to the base station 330.

When location information is used as the event trigger based on MSE and a setting of is a threshold value, it is possible to configure a procedure of requesting restart (activation) of measurement/measurement reporting or a change of the measurement parameter to be triggered if it is recognized that the terminal 310 has left the serving cell requested (or set) by the terminal 310 to stop measurement/measurement reporting, has moved the predetermined distance or more from the center of the serving cell, or has been located in a boundary area of the serving cell using location information applied by the system.

After determining to request restart (or activation) of measurement/measurement reporting or a change of the measurement parameter S313, the terminal 310 transmits a control message for requesting restart (or activation) of measurement/measurement reporting or a change of the measurement parameter according to content of a user setting or an event trigger to the base station 330 (S315).

In step S315, the terminal 310 may transmit information on a desired operation level of the terminal 310, or selectively transmit measurement results.

When the request for restart (or activation) of measurement/measurement reporting or the request for a change of the measurement parameter (or the information on the desired operation level of the terminal 310) received from the terminal 310 in step S315 is used, an event based on a timer and/or a threshold value set by the base station 330 occurs, or the base station 330 recognizes a change of a mobility state of the terminal 310 according to information obtained by estimating the mobility state of the terminal 310 in a separate method, the base station 330 may determine restart (or activation) of measurement/measurement reporting or a change of the measurement parameter (S317).

Subsequently, the base station 330 transmits a control message that instructs restart of measurement/measurement reporting or a change of the measurement parameter to the terminal 310 (S319). In step S319, the base station 330 may notify the terminal 310 of the operation level information of the terminal 310.

The terminal 310 receives the control message that instructs stop of measurement/measurement reporting or a change of the measurement parameter from the base station 330, and performs a measurement/measurement reporting operation again according to the change instructed by the received control message (S321).

In the measurement operation determination procedure of a terminal illustrated in FIG. 3, steps S301 to S321 may not be performed in sequence. For example, even when step S303 or step S305 in FIG. 3 has not been performed, the base station 330 may perform step S307 and step S309. Also, even when step S313 or step S315 in FIG. 3 has not been performed, the base station 330 may perform step S317 and step S319.

As illustrated in FIG. 3, in the measurement operation determination procedure of a terminal according to example embodiments of the present invention, the base station 330 and the terminal 310 cooperate with each other to determine whether or not to perform a measurement operation, a measurement operation level, or a measurement operation-related parameter according to a request of the terminal 310, thereby preventing unnecessary signaling overhead, reducing power consumption of the terminal 310, and improving the overall performance of a mobile communication system in a HetNet environment.

The measurement operation determination procedure illustrated in FIG. 3 can be applied to defining a DRX operation procedure of the terminal 310. In other words, the base station 330 and the terminal 310 may cooperate to determine whether or not to perform the DRX operation, a DRX operation level, or a DRX operation-related parameter according to a request of the terminal 310.

Figure 4:
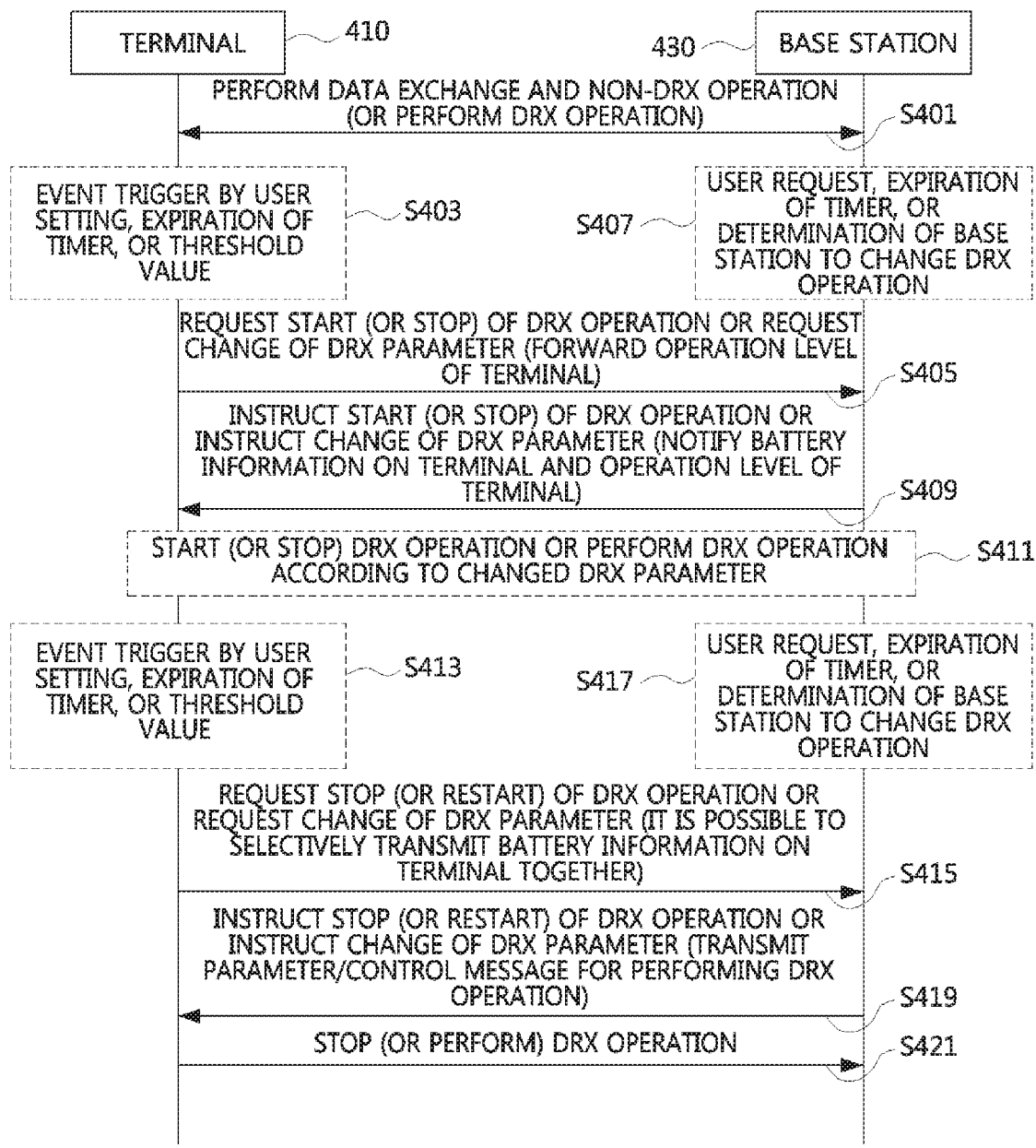
FIG. 4 is a message sequence diagram illustrating a discontinuous reception (DRX) operation determination procedure of a terminal in a method of managing a terminal according to example embodiments of the present invention.

FIG. 4 is a message sequence diagram illustrating a DRX operation determination to procedure of a terminal in a method of managing a terminal according to example embodiments of the present invention, that is, a procedure in which a base station 430 and a terminal 410 cooperate to determine whether or not to perform the DRX operation, a DRX operation level, or a DRX-related parameter.

Referring to FIG. 4, the terminal 410 first establishes a connection with the base station 430, and performs operation while exchanging data without setting DRX (S401). Alternatively, the terminal 410 may establish a connection with the base station 430 and then perform the DRX operation.

When a user manually changes a setting, a remaining time timer managed by the base station 430 expires, or an event trigger based on MSE and a setting of a threshold value is pulled, the terminal 410 may determine to request a DRX operation switch (S403). In step S403, the DRX operation switch denotes start of the DRX operation when the terminal 410 is currently performing no DRX operation (non-DRX operation), and an operation switch to deactivation of the DRX operation (i.e., non-DRX operation) when the terminal 410 is currently performing the DRX operation.

Subsequently, the terminal 410 transmits a control message for requesting a DRX operation switch (i.e., start or stop of the DRX operation) or a change of a DRX parameter to the base station 430 (S405).

In step S405, the terminal 410 may transmit information on a desired DRX operation level of the terminal 410 to the base station 430.

The base station 430 determines a DRX operation switch (i.e., start of the DRX operation or stop of the DRX operation) or a change of a DRX parameter using information on the DRX operation switch request (i.e., start of the DRX operation or stop of the DRX operation) or the DRX parameter change request (or the information on the desired operation level of the terminal 410) received from the terminal 410 in step S405, or according to an event trigger based on a timer or a threshold value of the base station 430 (S407).

Subsequently, the base station 430 transmits a control message that instructs the determined DRX operation switch (i.e., start of the DRX operation or stop of the DRX operation) or change of the DRX parameter to the terminal 410 (S409). In step S409, the base station 430 may notify the terminal 410 of the operation level information of the terminal 410.

The terminal 410 receives the control message that instructs the DRX operation switch or the change of the DRX parameter from the base station 430, and performs the DRX operation switch (start of the DRX operation or stop of the DRX operation) according to content instructed by the received control message or performs the DRX operation according to the changed DRX parameter (S411).

Subsequently, when a manual setting is made by the user, a set timer expires, or the event trigger based on MSE and a setting of a threshold value is pulled, the terminal 410 may determine to request stop (or restart) of the DRX operation or a change of a DRX parameter (S413).

In step S413, the manual setting by the user may denote a timer for starting or stopping the DRX operation personally set by the user of the terminal 410, or a case in which the user personally sets the DRX operation for stop of the DRX operation or restart of the DRX operation while the terminal 410 is moving from a place at which start of the DRX operation or stop of the DRX operation has been set.

Also, in step S413, the terminal 410 may use a signal transmitted from a serving cell or location information as an event trigger based on MSE and a setting of a threshold value.

A case in which the terminal 410 uses the signal transmitted from the serving cell may denote an event defined for the terminal 410 to receive the signal transmitted from the serving cell, compare the received signal with a predetermined reference value, and transmit a DRX operation stop request or a DRX operation restart request to the base station 430 or make a DRX parameter change request on the basis of the comparison result. Here, the signal transmitted from the serving cell may be defined to be a CRS, a CSI-RS, a DM-RS (or a UE-specific RS), a PRS, or an RSSI, an RSRP, an RSRQ, a SIR, etc. of an RS from which a signal received from other cells (base stations or transmission nodes) can be estimated.

Thus, the event trigger based on MSE and a setting of a threshold value may denote that the terminal 410 recognizes that the terminal 410 has left the serving cell, has moved a predetermined distance or more from the center of the serving cell, or has been located in a boundary area of the serving cell using a signal transmitted from the serving cell, and transmits a control message for requesting stop (restart) of the DRX operation or changing a DRX parameter to the base station 430 when a condition of an event set to request stop (restart) of the DRX operation or a change of a DRX parameter is satisfied.

When location information is used as the event trigger based on MSE and a setting of a threshold value, a procedure of requesting stop (or restart) of the DRX operation or a change of a DRX parameter may be controlled to be triggered if it is recognized that the terminal 410 has left the serving cell requested (or set) by the terminal 410 to stop the DRX operation, has moved the predetermined distance or more from the center of the serving cell, or has been located in a boundary area of the serving cell using location information applied by the system.

Referring back to FIG. 4, when the event trigger based on a personal setting by the user, a timer, or a threshold value is pulled as described above in step S413, the terminal 410 transmits a control message for requesting stop of the DRX operation (or restart of the DRX operation) or a change of the DRX parameter according to content of the setting by the user or the pulled event trigger to the base station 430 (S415). Here, the terminal 410 may transmit information on a desired operation level of the terminal 410, or selectively transmit battery information on the terminal 410.

The base station 430 may determine stop (or restart) of the DRX operation or a change of the DRX parameter using the DRX operation switch request (i.e., a change to deactivation of the DRX operation (non-DRX operation) during the DRX operation, or a change to restart of the DRX operation during a non-DRX operation) or the DRX parameter change request (or the information on the desired operation level of the terminal 410) received from the terminal 410, or when an event based on a timer of the base station 430 or a threshold value occurs (S417).

Subsequently, the base station 430 transmits a control message that instructs stop (or restart) of the DRX operation or a change of the DRX parameter to the terminal 410 (S419). At this time, the base station 430 may notify the terminal 410 of the operation level information of the terminal 410.

The terminal 410 receives the control message that instructs stop (or restart) of the DRX operation or a change of the DRX parameter from the base station 430, and stops (or performs) the DRX operation or changes the DRX parameter to perform the DRX operation according to the instruction of the received control message (S421).

In the DRX operation determination procedure of a terminal illustrated in FIG. 4, steps S401 to S421 may not be performed in sequence. For example, even when step S403 or step S405 in FIG. 4 has not been performed, the base station 430 may perform step S407 and step S409. Also, even when step S413 or step S415 in FIG. 4 has not been performed, the base station 430 may perform step S417 and step S419.

In the steps illustrated in FIG. 3 and FIG. 4, pieces of control information may be configured as one control message or separately configured as two or more control messages and transmitted. When pieces of control information are configured as two or more control messages, the control messages may be configured on the basis of different radio protocol layers such as the RRC layer RRC control message using a channel dedicated to signaling), the MAC (MAC control PDU) layer, and the physical layer (a physical control channel, a PDCCH, a physical uplink control channel (PDCCH), etc.).

For example, a function and parameter for the DRX operation or a measurement/measurement reporting operation are (re)set using an RRC layer control message, and activation (deactivation) of each DRX operation or measurement operation, a parameter change request or instruction, etc. may be performed using a MAC layer or physical layer control message (a MAC control PDU, information field bits or indication bits of a physical control channel, feedback information bits, and so on).

In other words, when a terminal transmits information bits indicating activation (deactivation) of the DRX operation or each measurement operation set through an RRC layer control message, a parameter change, or a desired specific parameter value or range to a base station using a MAC layer or physical layer control message, the base station may determine whether or not to perform activation (deactivation) and make a parameter change according to the control information (hits) received from the terminal, and then instruct the terminal to activate (deactivate) each operation or change a parameter using an RRC control message or a MAC layer or physical layer control message.

Meanwhile, a terminal may have mixed functions. For example, a user terminal may be a terminal having a general voice and data service function, a terminal supporting an MTC function, a terminal supporting the D2D communication function of exchanging voice or data through D2D communication not via a base station or a node of a mobile communication network, a terminal supporting a wireless local area network (LAN) function such as wireless fidelity (WiFi), or a terminal supporting all the aforementioned functions.

A terminal supporting mixed functions as mentioned above may consume more power as a variety of functions are performed. For example, a terminal supporting the wireless LAN function continuously searches for a wireless LAN access point (AP) to access a wireless LAN, and a terminal supporting D2D communication performs a search or monitoring to check whether or not there is another terminal, whether or not there is a D2D communication service, etc., and thus power consumption may increase. Also, a terminal supporting a global positioning system (GPS) function performs operation for detecting a GPS signal, which may increase power consumption. In other words, when a terminal having mixed functions performs a variety of functions, power consumption increases, and thus usage time of a battery installed in the terminal is reduced.

To reduce power consumption of a terminal, a method of controlling various functions of the terminal to be selectively performed according to a setting of a user, an implicit scheme, or an autonomous scheme may be used.

Figure 5:
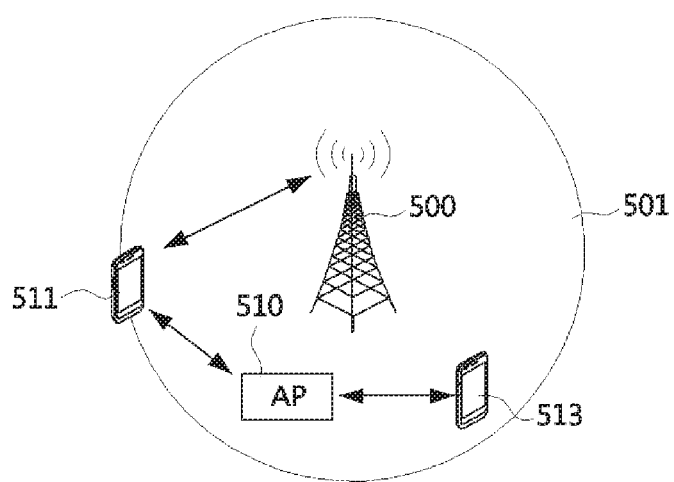
FIG. 5 is a conceptual diagram illustrating a network environment to which a method of managing a terminal according to example embodiments of the present invention is applied.

FIG. 5 is a conceptual diagram illustrating a network environment to which a method of managing a terminal according to example embodiments of the present invention is applied, that is, an AP search scenario of a terminal when an AP 510 of a wireless LAN is in a service area 501 of a predetermined base station 500.

Referring to FIG. 5, terminals 511 and 513 may receive necessary service via the AP 510 for a wireless LAN service in the service area 501 of the base station 500. However, in order to receive such a wireless LAN service, it is not necessary for the terminals 511 and 513 to maintain a function of searching the AP 510 in an active state all the time.

In other words, in order to search for the necessary AP 510 while reducing power consumption of the terminals 511 and 513, the terminals 511 and 513 may be set to search for or monitor the AP 510 only when the terminals 511 and 513 enter the service area 501 of the base station 500 in which the AP 510 is located.

In a mobile communication system, the terminal 511 having established a connection with the base station 500 or the terminal 513 not having established a connection with the base station 500 may acquire information, such as a unique identifier (ID) (e.g., cell ID) of the base station 500 or an ID (e.g., local area ID) indicating the service area 501 of the base station 500, and an RAID, from system information broadcast by the base station 500.

Thus, a terminal may be set to search for an AP for a wireless LAN service only when a user designates a specific base station and enters a service area of the designated specific base station.

For example, a terminal may be set to start an AP search or monitoring operation when the terminal checks a school, a company, a home, an area specially designated by a user, or a service area of a home base station or a CSG cell, and enters the service area of the corresponding base station or the corresponding area, and may be set to stop an AP search or monitoring operation when the terminal leaves the service area of the corresponding base station or the corresponding area.

The aforementioned setting of the terminal may be made through only a procedure in which the user selects the corresponding area through a user interface of the terminal with no need to recognize or check an ID of the corresponding base station or the corresponding area. For example, by only selecting or touching a button, an icon or a graphic object enabling AP search or monitoring in a monitor screen of a terminal, the corresponding area or base station may be set as an area or base station that enables AP search or monitoring. When a specific area or a specific base station is selected in such a way, the terminal may store an ID of the specific area or the specific base station using system information of a mobile communication system. Subsequently, the terminal may be controlled to perform a wireless LAN AP search or monitoring operation when the terminal enters a service area of the specific area or the specific base station, and a procedure in which the user rechecks whether to enable execution of a wireless LAN AP search or monitoring operation through a pop-up in a monitor of the terminal or a signaling (e.g., sound or vibration) may be introduced.

Meanwhile, as described above, the function of searching for or monitoring an activated wireless LAN AP may be implicitly or autonomously deactivated not to perform the corresponding AP search or monitoring operation when a terminal leaves a set specific area or a service area of a specific base station, or a procedure in which a user performs rechecking may be introduced to determine whether or not to perform AP search or monitoring according to a result of rechecking by the user.

Figure 6:
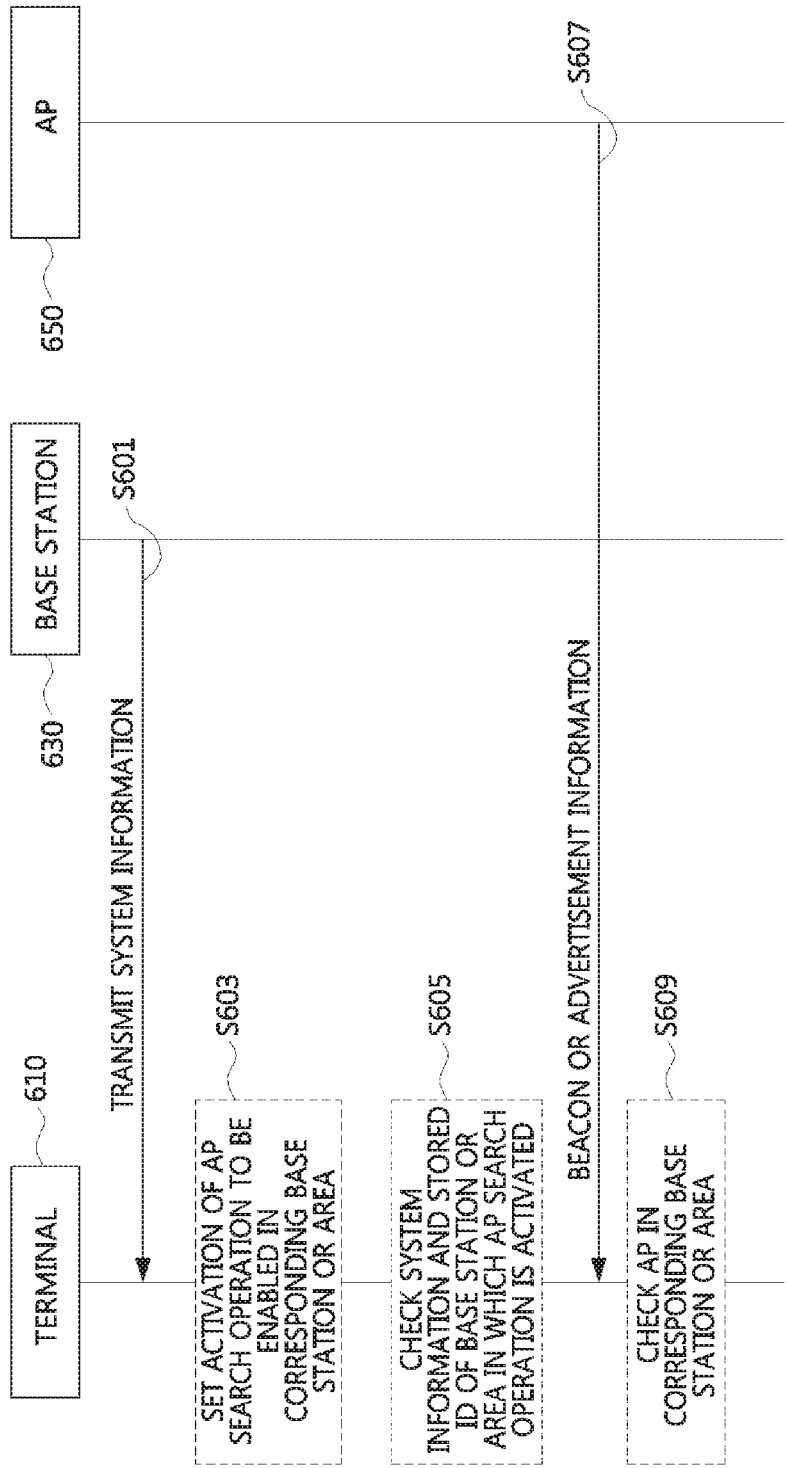
FIG. 6 is a message sequence diagram illustrating an access point (AP) search procedure in a method of managing a terminal according to example embodiments of the present invention.

FIG. 6 is a message sequence diagram illustrating an AP search procedure in a method to of managing a terminal according to example embodiments of the present invention.

Referring to FIG. 6, when a terminal 610 is located in a service area of an arbitrary base station 630, the terminal 610 may receive system information broadcast by the base station 630 (S601), and recognize an ID of the base station 630 and/or an ID of an area in which the terminal 610 is currently located using the received system information. The terminal 610 is set to enable activation of an operation of searching for or monitoring an AP 650 for a wireless LAN when a user is at the base station 630 or in an area to which the base station 630 belongs and wants to the activation (S603). As mentioned above, the terminal 610 may be configured to provide a user interface, so that the user adds the base station 630 or area information to a list enabling a search for the AP 650 through the user interface.

After the specific base station 630 or the specific area is set as a target for which the operation of searching for or monitoring the AP 650 is enabled to be activated, the terminal 610 checks the ID of the base station 630 or the area included in the system information broadcast by the base station 630 during a movement, and determines whether the ID coincides with an ID for which the operation of searching for or monitoring the AP 650 is enabled to be activated (S605).

When the of the base station 630 or the area acquired from the system information broadcast by the base station 630 coincides with the ID for which the operation of searching for or monitoring the AP 650 is enabled to be activated, the terminal 610 receives beacon information, advertisement information, etc. transmitted by the AP 650 (S607). Using the received pieces of information, the terminal 60 searches for or monitors the AP 650 capable of a wireless LAN service, and activates a wireless LAN service when the AP 650 capable of a wireless LAN service is searched for (S609).

Meanwhile, a procedure in which the user rechecks whether to enable activation of the operation of searching for or monitoring a wireless LAN AP in a service area of a specific base station or in a specific area may be added after step S605 of FIG. 6.

In the AP search procedure of a terminal illustrated in FIG. 6, when the operation of searching for or monitoring a wireless LAN AP is activated, the terminal 610 may check the system information on the mobile communication system to determine whether or not the ID of the base station 630 or the area in the system information coincides with the ID for which the operation of searching for or monitoring an AP is enabled to be activated (S605), and may implicitly control the operation of searching for or monitoring a wireless LAN AP to be deactivated.

According to procedures as illustrated in FIG. 5 and FIG. 6, a complex terminal having a variety of functions may control various functions as well as the above-described operation of searching for or monitoring a wireless LAN AP to be activated only when the terminal enters a service area of a specific base station or a specific area.

For example, when a terminal having mixed functions is a terminal capable of D2D communication, a terminal (e.g., a specific terminal of a family member, an acquaintance, or so on) separately registered for a D2D communication service, or an MTC terminal, procedures as illustrated in FIG. 5 and FIG. 6 may be applied as a procedure of activating (or deactivating) an operation of searching for or monitoring a service signal related to D2D communication or a procedure of activating (or deactivating) an MTC function, and thereby it is possible to control the procedures to be activated (or deactivated) when the terminal enters a service area of a specific base station or a specific area.

Also, a complex terminal having the GPS function may be set to always receive a GPS signal when external power is connected to the terminal, and set to receive no GPS signal when a connection with external power is closed. When it may be implicitly determined that a complex terminal having the GPS function is located indoors such as a home or a company (e.g., when it is possible to check that the terminal having the GPS function is located in a service area of a home base station or a CSG cell), the method and procedure described above may be applied to deactivate an operation of receiving a GPS signal.

Meanwhile, according to the procedure of activating and deactivating a wireless LAN AP search or monitoring operation illustrated in FIG. 6, the measurement and measurement reporting operation activation/deactivation procedure and the DRX operation activation/deactivation procedure illustrated in FIG. 3 and FIG. 4 may be configured to be activated when a terminal enters a service area of a predetermined base station, and to be deactivated when the terminal leaves the service area of the predetermined base station.

For example, procedures related to setup for activating the AP search operation performed in step S603, step S605 and step S609 of FIG. 6 may be applied to the measurement and measurement reporting operation activation/deactivation procedure and the DRX operation activation/deactivation procedure. In other words, for the measurement and measurement reporting operation activation/deactivation procedure and the DRX operation activation/deactivation procedure, the trigger of step S303 and step S313 of FIG. 3 or step S403 and step S413 of FIG. 4 may not be based on a timer or a threshold value, but ID information on the base station 330 or 430 may be compared with a predetermined base station ID (or area ID) and checked to request an operation switch for activating or deactivating execution of a measurement/measurement reporting operation or the DRX operation from the base station 330 or 430. Here, the base station ID (or area ID) set in advance to trigger execution of activation or deactivation of the measurement/measurement reporting operation or the DRX operation may be set to be a specific base station (or group), such as a home base station, CSG, company or school, or area ID by a user, or may be set through a message when the user subscribes to service or establishes a connection in a mobile communication network.

Recently, a terminal such as a smart phone or a pad-type terminal is always connected to a mobile communication network or a wireless LAN to provide service of an "always-on" to concept, and provides a variety of services such as a messenger and mail transmission and reception.

However, when a terminal continuously maintains a connection with a base station to provide service as mentioned above, control signaling for a measurement operation or measurement result reporting increases in the connected state (e.g., an RRC_connected state), a failure may occur in a mobility management procedure such as handover, power consumption of the terminal increases, occupation of physical control channel resources such as feedback information, a sounding symbol or a reference symbol increases, and thereby efficiency of the system is lowered.

To solve these problems caused when a terminal continuously maintains a connection with a base station, a terminal providing service such as a messenger and mail transmission and reception that generates burst data may be managed in the idle state. However, in this case, a state switch from the idle state to the connected state frequently occurs to forward data from or to the terminal, and control signaling necessary for connection establishment increases according to such a frequent state switch, which lowers efficiency of the system as a result.

To overcome such inefficiency of a system, a dormant state corresponding to an intermediate state between the connected state and the idle state may be introduced, like in an existing universal mobile telecommunication system (UMTS). However, in this case, introduction of the dormant state requires a change of a standard procedure, and thus it is difficult to use the dormant state in practice.

Thus, instead of introducing an additional state such as the dormant state, information (e.g., RRC context information) on a terminal may be maintained for a predetermined time even after a connection between a base station and the terminal is closed when the terminal switches from the connected state to the idle state.

In other words, when all data stored in a transmission buffer of the terminal or the w base station is transmitted, and new transmission data is not generated for a predetermined time, the terminal is controlled to switch from the connected state to the idle state. At this time, information (e.g., RRC context information) on the terminal is not removed immediately after disconnection, but maintained for the predetermined time or a time set in a disconnection procedure. In this case, the connection between the terminal and the base station has been closed, it is not necessary for the terminal to perform a measurement operation and measurement result reporting that have been performed in the connected state, and also it is possible to avoid occupation of physical control channel resources such as feedback information, a sounding symbol or a reference symbol.

In addition, a mobility management procedure of the terminal can be controlled to be performed on the basis of the idle state rather than the connected state, and thus it is possible to reduce power consumption of the terminal.

Meanwhile, when new data is generated during a time in which information on a terminal is maintained even if a connection between the terminal and a base station has been closed, and the terminal switches from the idle state to the connected state, it is possible to reduce signaling overhead necessary for a connection establishment procedure using the maintained information (e.g., RRC context information) on the terminal.

Terminal information maintained for a predetermined time after a connection between a terminal and a base station has been closed denotes information, such as information related to mobility of the terminal, terminal ID information, information on service provided to the terminal, ciphering (security) information, data information and information related to retransmission, setup information on the MAC layer and the RLC layer, physical control channel setup information, and management information on the established connection, that is necessary for the base station and the terminal to maintain the connection and provide service. Here, information necessary to be maintained during an information maintenance time may be selectively set from among the aforementioned pieces of information, and w terminal information to be maintained may be separately set by the base station and the terminal.

A time in which terminal information is maintained may be set in units of milliseconds, seconds, minutes, or hours, and managed through a tinier. When the information maintenance time (or terminal information removal time) timer expires, stored terminal information is removed, and thus cannot be used in a connection establishment procedure.

A terminal information maintenance time (or timer) may be set according to base station or arbitrary terminal. If the terminal information maintenance time is set according to base station, the terminal information maintenance time may be transmitted to terminals using system information broadcast by a base station, or the base station may forward a parameter indicating the terminal information maintenance time to the terminal when the connection is established (or closed).

On the other hand, if the terminal information maintenance time is set according to terminal, the base station may forward the information maintenance time parameter to the corresponding terminal when the connection is established (or closed). The information maintenance time parameter or whether or not to apply the information maintenance time parameter may be determined according to a service type, a traffic type, a terminal capability (UE capability), or so on.

As described above, even when a connection between a base station and a terminal is closed, information necessary for connection establishment or partial information is stored for an information maintenance time, and when the connection is established again in the information maintenance time, the stored information is used to reduce signaling overhead of the re-establishment procedure. When the information maintenance time expires, maintained terminal information is removed.

Meanwhile, when a base station that a terminal attempts to access in an information maintenance time is changed due to movement of the terminal, the base station to which the terminal attempts a connection establishment procedure may be notified of information on a base station that is maintaining information on the terminal, so that the terminal information camp be received via a network.

In addition, a disconnection timer (e.g., RRC release timer) may be introduced, so that a connection between a base station and a terminal is closed after the disconnection timer expires.

When a disconnection timer is used, it is the connected state before the disconnection tinier expires. Thus, control signaling for a measurement operation and measurement result reporting in the connected state (e.g., the RRC_connected state) increase, a failure may occur in a mobility management procedure such as handover, power consumption of the terminal may increase, and occupation of physical control channel resources such as feedback information/a sounding symbol/a reference symbol increases.

However, it is possible to avoid signaling overhead necessary for a connection establishment procedure according to frequent state switching. Like an information maintenance time parameter, a disconnection timer may also be set in units of milliseconds, seconds, minutes, or hours, and set according to a base station or an arbitrary terminal.

Whether or not to apply a disconnection timer parameter may be determined according to a service type, a traffic type, a terminal capability (UE capability), or so on.

When making a disconnection request, a terminal may request setup of an information maintenance time parameter or a disconnection timer parameter, or application of an information maintenance time or a disconnection tinier. When a request as mentioned above is received in a disconnection procedure, a base station may forward an information maintenance time parameter or a disconnection timer parameter to the terminal, or set or instruct application of the information maintenance time or whether or not to apply the disconnection tinier before disconnection.

Meanwhile, by introducing a "log-in" concept of maintaining a connection of provided service regardless of a screen change, a terminal may be configured to request stop (deactivation) of measurement/measurement reporting, a change of a measurement parameter, a DRX operation switch, a change of a DRX parameter, etc. according to a manual setting by a user when a "screen lock function," a "screensaver function," etc. is performed by a user's key or touch manipulation or a timer set in advance, and a screen of the terminal maintaining a connection for service is changed.

Also, a manual setting by a user may be applied to a case in which the "screen lock function" or the "screensaver function" is stopped by the user. In other words, a terminal may be configured to request restart (activation) of measurement/measurement reporting, a change of a measurement parameter, a DRX operation switch, a change of a DRX parameter, etc. from a base station when the "screen lock function" or the "screensaver function" is stopped by a user's key or touch manipulation or a timer set in advance, and a screen of the terminal is changed.

In addition to a method based on a screen change function of a terminal as mentioned above, a manual setting by a user denotes all methods in which a user personally sets a related parameter or sets an operation change through key or touch manipulation to change a measurement operation or the DRX operation of a terminal.

The screen change function of a terminal or a manual setting change by a user including personal setup of a related parameter or an operation change by the user is recognized through a function of control software installed in the terminal, and a function in the terminal corresponding to the screen change function or the manual setting change is performed, so that an event for the terminal to make the operation change may be configured to be triggered according to the manual setting change by the user.

The "log-in" concept may denote a state in which, when a screen of a terminal is blocked by the "screen lock function," the "screensaver function" or other methods, or a user to has made no input through an input means of the terminal for a predetermined time while the terminal is maintaining a connection with a base station for service, measurement operations of the terminal are reduced as much as possible or deactivated, the DRX function is applied to the same level as in the idle state, and thereby power consumption of the terminal is minimized.

When a terminal is in the "log-in" state, a handover procedure different from a mobility procedure in a general connected state (i.e., the RRC_connected state) may be applied to the terminal. For example, a handover procedure is not performed every time a cell is changed due to movement of a terminal, but may be performed only when a cell level is changed, or the terminal leaves a predetermined area. Here, a case in which a cell level is changed may denote movement between a macro cell and a micro cell (or pico cell, CSG cell or home cell) having different power levels or service area sizes.

In other words, a terminal may be configured to perform a handover procedure only when the terminal in the "log-in" state moves from a macro cell to a small cell such as a pico cell, a CSG cell or a home cell. Also, a terminal may be configured to perform a handover procedure even when the terminal in the "log-in" state moves between different pico cells, CSG cells or home cells having similar power levels but different cell attributes. For example, a terminal may be configured to perform a handover procedure when the terminal in the "log-in" state moves from a CSG cell to a pico cell or a home cell.

Alternatively, a terminal may be configured to perform a handover procedure only when the terminal leaves a predetermined area, the terminal leaves a plurality of cell areas included in a predetermined range such as a tracking area (TA) or an RA even between cells of the same level, or the terminal in the "log-in" state moves through a predetermined number of cells or more.

Alternatively, in case of need, even a terminal in a general connected state rather than the aforementioned "log-in" state may perform a handover procedure to reduce system overload or signaling overhead caused by the handover procedure only when a cell level is changed, or the terminal leaves a predetermined area.

Figure 7:
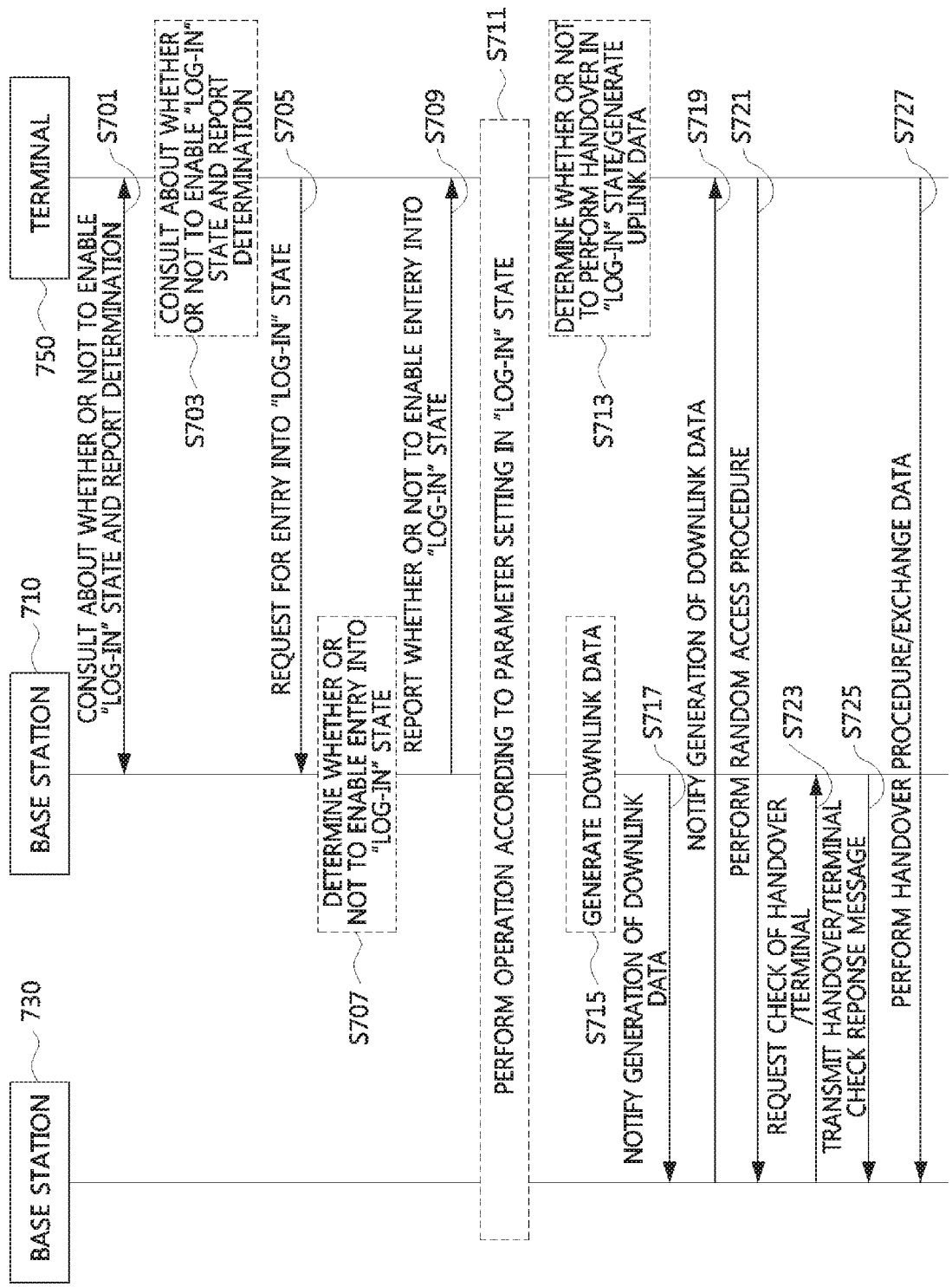
FIG. 7 is a message sequence diagram illustrating a handover procedure in a method of managing a terminal according to example embodiments of present invention When a terminal is in a log-in state.

FIG. 7 is a message sequence diagram illustrating a handover procedure in a method of managing a terminal according to example embodiments of present invention when a terminal is in the log-in state.

Referring to FIG. 7, a base station 710 sets in advance whether or not to enable an arbitrary terminal 750 to enter the "log-in" state (S701). The terminal 750 may transmit a control message that requests a "log-in" state function to be enabled or disabled to the base station 710. The base station 710 receives the control message that is transmitted from the terminal 750 to request the "log-in" state function to be enabled or disabled, determines whether or not to enable the "log-in" state function, and then transmits a control message that sets the "log-in" state to be enabled or disabled to the terminal 750 as the determination result. Even when there is no request from the terminal 750, the base station 710 may transmit a control message that sets the "log-in" state to be enabled or disabled to the terminal 750.

The terminal 750 receives the control message that enables the "log-in" state from the base station 710, determines whether or not an event condition for entering the "log-in" state is satisfied, and then determines whether or not to request entry into the "log-in" state when the event condition for entering the "log-in" state is satisfied (S703).

When the terminal 750 determines to enter the "log-in" state, the terminal 750 transmits a control message that requests entry into the "log-in" state to the base station 710 (S705). As mentioned above, the control message that requests entry into the "log-in" state may be transmitted with a control message that requests stop (deactivation) of measurement/measurement reporting according to an event based on an operation level of the terminal 750 or a manual setting of a user, a change of a measurement parameter, a DRX operation switch, a change of a DRX parameter, etc., or may replace the control message. Alternatively, the control message that requests stop (deactivation) of measurement/measurement reporting, a change of a measurement parameter, a DRX operation switch, a change of a DRX parameter, etc. may be transmitted instead of the control message that requests entry into the "log-in" state.

The base station 710 receives the control message that requests entry into the "log-in" state from the terminal 750, and determines whether or not to enable the terminal 750 to enter the "log-in" state (S707).

Subsequently, the base station 710 transmits a control message that announces whether or not to enable the terminal 750 to enter the "log-in" state according to the determination result of step S707 to the terminal 750 (S709). Here, the base station 710 may be configured to transmit a control message only when entry into the "log-in" state is enabled, and transmit no control message when entry into the "log-in" state is disabled. In order for the terminal 750 to operate according to such operation of the base station, the terminal 750 may be configured to implicitly recognize that the base station 710 does not enable entry into the "log-in" state and does not enter the "log-in" state when the control message that enables entry into the "log-in" state is not received for a predetermined time after the terminal 750 transmits the control message that requests entry into the "log-in" state, and the terminal 750 may be configured to transmit the control message that requests entry into the "log-in" state only when the predetermined time elapses, or a condition is satisfied.

The terminal 750 receives the explicit control message that enables entry into the "log-in" state from the base station 710 or recognizes that entry into the "log-in" state is enabled in the aforementioned implicit method in step S709, and performs a measurement and reporting operation, the DRX operation, etc. according to a parameter setting for the "log-in" state (S711).

In example embodiments of the present invention, the base station 710 may control the terminal 750 in the "log-in" state to conform to a limited handover method and procedure. In other words, even when a cell is changed in the connected state, the terminal in the "log-in" state may be configured to acquire system information and stay without performing handover in case of need as in a camping procedure of a terminal that is in the idle state in an adjacent cell. When a terminal in the "log-in" state is configured to conform to the limited handover method and procedure, the terminal may be configured not to perform handover every time a cell is changed but to perform handover only when a cell level is changed, or the terminal leaves a predetermined area.

Thus, the terminal 750 in the "log-in" state determines whether or not there is data to be transmitted over an uplink and whether or not to perform handover in the "log-in" state (S713), and performs a random access (RA) procedure to a base station 730 of a cell in which the terminal 750 is currently located when there is data to be transmitted over an uplink, a change in cell level is recognized, or it is recognized that the terminal 750 has left the predetermined area (S721). At this time, the terminal 750 transmits an RA preamble to the base station 730 for the RA procedure, receives an RA response message to the RA preamble from the base station 730, and then transmits information on the serving cell 710 to which the terminal 750 has established a connection, a terminal ID, information on a connected RB, etc. to the base station 7300. In addition, the terminal 750 may transmit a control message that requests limited handover or allocation of uplink resources for uplink data transmission to the base station 730. Here, the information on the serving cell 710 may include a cell type, a cell ID, a physical cell ID (PCI), radio access technology (RAT) information on the cell 710, and so on. The terminal ID may include ID information, such as a cell-radio network temporary identifier (C-RNTI) allocated by the serving cell 710, that enables a base station to uniquely identify the terminal 750. Also, the connected RB information may include control parameter information for a logical connection and physical connection established between the serving cell 710 and the terminal 750 for service that is being provided.

The base station 730 receives a handover request or an uplink resource allocation from the terminal 750 in the "log-in" state in step S721, and transmits a control message that to requests the serving cell base station 710 to check information on the terminal 750 or perform handover to the serving cell base station 710 (S723).

The serving cell base station 710 receives the control message that requests check of information on the terminal 750 maintaining a connection with the serving cell base station 710 itself in the "log-in" state or handover from the arbitrary base station 730, sets the base station 730 as a target base station, and forwards control information necessary for a handover procedure and/or information on the terminal 750 stored in the serving cell base station 710 itself (S725).

The target base station 730 receives a response message to the request for checking information on the terminal 750, a response message to the handover request, or the information on the terminal 750 stored in the serving cell base station 710 from the serving cell 710, stores the received information on the terminal 750, and then newly sets a control parameter necessary for handover to finish the handover procedure, and in case of need, allocates uplink resources for data transmission and receives data from the terminal 750 (S727).

Meanwhile, when downlink data to be transmitted to the terminal 750 in the "log-in" state is generated, the base station 710 requests an adjacent base station including the base station 730 to notify the terminal 750 that downlink data has been generated (S717).

The base station 730 that has received a request for notification of downlink data for the terminal 750 in the "log-in" state in step S717 notifies the terminal 750 of generation of downlink data using paging information (S719).

When the terminal 750 in the "log-in" state checks the paging information that notifies the terminal of generation of downlink data in a process of acquiring system information on the cell 730 in which the terminal 750 itself stays and monitoring paging information, the terminal 750 performs an RA procedure to the cell 730 (S721).

The base station 730 having checked a response to the paging information through the to RA procedure of the terminal 750 in the "log-in" state in step S721 may transmit a message that requests handover together with information on the terminal 750 to the serving cell 710 (S723).

The serving cell base station 710 may receive the request for information on the terminal 750 in the "log-in" state from the base station 730, and forward downlink data together with a response message or transmit a control message for changing a data path between a base station and a network to the target base station 730 and a network.

The base station 730 may receive the downlink data to be transmitted to the terminal 750 from the serving cell 710, finish a handover procedure with the terminal 750, and transmit the downlink data to the terminal 750 (S727).

In the handover method and procedure for the terminal 750 in the "log-in" state illustrated in FIG. 7, a control message between the base stations 710 and 730 and the terminal 750 may be configured to be transmitted in the form of a layer 3 message (e.g., RRC control information) or a layer 2 message (e.g., a MAC control PDU or a MAC control element). Also, as a control message between the serving cell base station 710 and the target cell base station 730 existing handover request and handover response messages may be used, or an additional control message may be configured and transmitted.

Description will be made below regarding an example in which a method of managing a terminal according to example embodiments of the present invention is applied to a HetNet environment including a cloud base station.

The above-described mobility management for a terminal in the "log-in" state can be more efficiently applied to a HetNet environment including a cloud base station.

Figure 8:
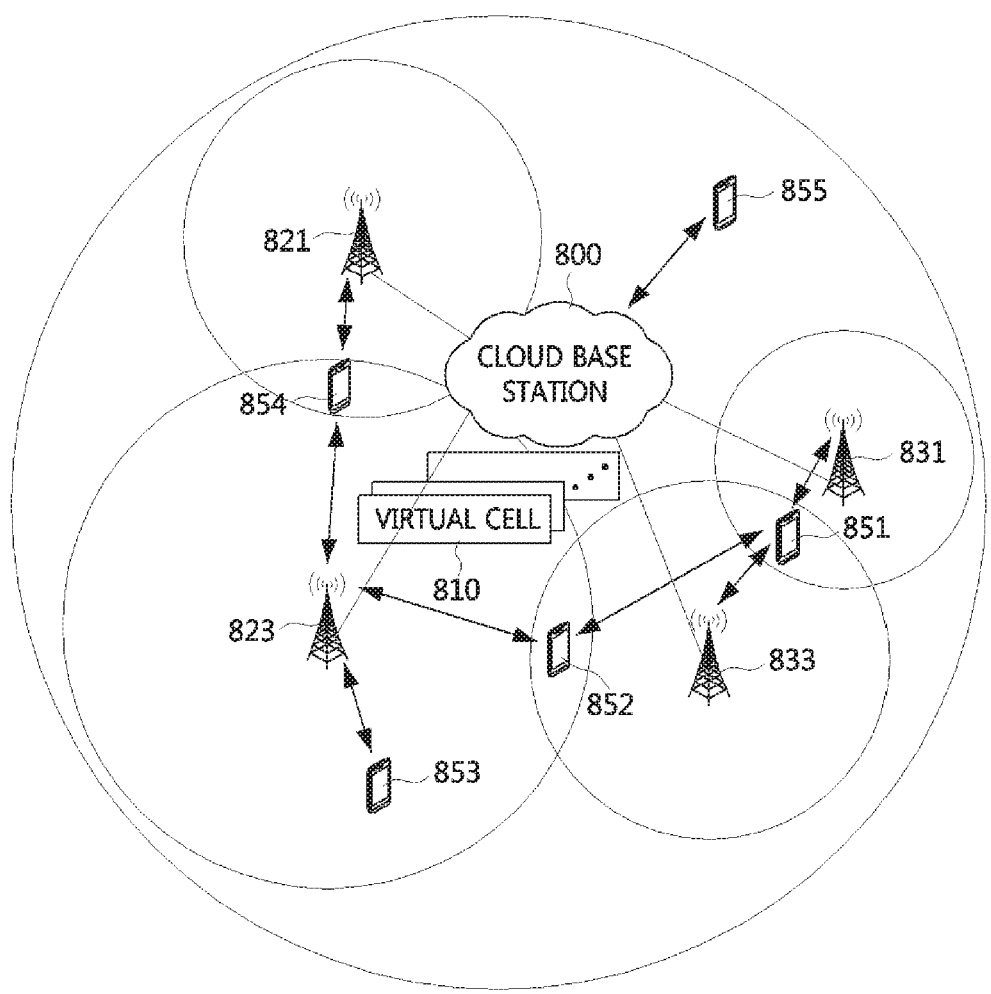
FIG. 8 is a conceptual diagram showing a constitution example of a HetNet including a cloud base station to which a method of managing a terminal according to example embodiments of the present invention is applied.

FIG. 8 is a conceptual diagram showing a constitution example of a HetNet including a cloud base station to which a method of managing a terminal according to example embodiments of the present invention is applied.

Referring to FIG. 8, a cloud base station 800 may include a virtual cell 810 that to performs a function of a base station, and remote wireless nodes (e.g., RRHs or radio units (RUs)) 821 and 823 that perform an RF function. The cloud base station 800 and the remote wireless nodes 821 and 823 may be connected through a wired or wireless interface, and the connection is not limited to a specific connection method.

The cloud base station 800 may include the one or more virtual cells 810 and the one or more remote wireless nodes 821 and 823, and may include a control entity performing a control function to efficiently manage the one or more virtual cells 810 and the one or more remote wireless nodes 821 and 823.

Using the plurality of virtual cells 810 and the plurality of remote wireless nodes 821 and 823, the control entity of the cloud base station 800 may perform coordinated operation and function distribution functions necessary for controlling interference, managing mobility, and supporting the CoMP function, an RRM function and a HetNet function, and control related functions.

The cloud base station 800 may configure radio protocol functions of a physical layer (layer 1), layer 2, and layer 3 generally supported by a base station to be distributed to the virtual cells 810 and the remote wireless nodes 821 and 823. Here, functions of layer 2 may include RLC, MAC and packet data convergence protocol (PDCP) functions, and functions of layer 3 may include an RRC function. The remote wireless nodes 821 and 823 of the cloud base station 800 may be configured to handle the radio function and some functions of the physical layer, and the virtual cells 810 may handle the other functions of the physical layer and functions of layer 2 and layer 3. Alternatively, the remote wireless nodes 821 and 823 may be configured to handle the radio function, functions of the physical layer, and a part of a MAC function of layer 2, and the virtual cells 810 may handle other functions of layer 2 and functions of layer 3.

The cloud base station 800 has all functions of a general base station to serve as a macro base station, thereby providing service directly to a general user terminal 855 in a to service area.

The cloud base station 800 may include micro base stations 831 and 833 consisting of small cells, such as a pico cell, a CSG cell, and a home base station (home node), having a small service area in the service area of the cloud base station 800. The remote wireless node 823 and the micro base station 833 of the cloud base station 800 may provide service to a user terminal 852 together using the CA or CoMP function, and so on.

In a HetNet including the cloud base station 800 as described above, the above-described mobility management for a terminal in the "log-in" state can be more efficiently applied.

In other words, when a mobility management procedure is performed with a terminal maintained in the "log-in" state without switching the terminal to the idle state to support a function of transmitting instant message (TM) traffic that is a small amount of data generated at long data generation intervals or a small amount of data that is intermittently generated by a terminal such as a smart phone, it is possible to support service of the ultimate concept of "Always-On."

For example, when the cloud base station 800 is installed in a building, it is possible to configure a mobility management function (e.g., a procedure for handover or changing a remote wireless node) caused by a change of a remote wireless node not to be performed if a terminal 853 generating IM traffic receives service from the remote wireless node 821, leaves a service area of the remote wireless node 821 in the "log-in" state, and then moves to a service area of the other remote wireless node 823 in the building.

When a general mobility management procedure is performed, although there is no data to be transmitted or received, a terminal and a base station need to exchange information for transmitting a control message for mobility management and perform the DRX operation again, or exchange control messages to perform a procedure for entering the "log-in" state.

However, example embodiments of the present invention are configured to be able to restart service using the remote wireless node 823 having a point at which a terminal is located as a service area and a procedure illustrated in FIG. 7 only when IM traffic is generated while the terminal in the "log-in" state is moving in a building including a cloud base station, or there is paging information for a network.

Meanwhile, only a remote wireless node constituting a cloud base station may be configured to perform the procedure illustrated in FIG. 7 when a terminal in the "log-in" state restarts service due to generation of uplink or downlink data in a cloud base station environment. Here, the terminal may be configured to attempt access for restarting service to the cloud base station 800 supporting macro service when the terminal is located in service areas of the micro base stations 831 and 833 in the service area of the cloud base station 800 and finds no remote wireless node constituting the cloud base station 800.

As described above, when the cloud base station 800 manages mobility of a terminal in the "log-in" state, a handover/terminal checking procedure of step S723 and step S725 and a downlink data generation notification procedure of step S717 may not be performed in the procedure illustrated in FIG. 7. Also, in step S727 of FIG. 7, data transmission and reception may be enabled by only checking a connection between a terminal and a remote wireless node without performing a handover procedure.

When there is no limitation as described above in a HetNet environment including the cloud base station 800 as shown in FIG. 8, a terminal may attempt access for restarting service through a micro base station present in the service area of the cloud base station 800 according to the procedure illustrated in FIG. 7.

However, when a terminal in the "log-in" state leaves the service area of the cloud base station 800, a general handover procedure may be performed.

To efficiently manage mobility of a terminal and improve efficiency of a system in a HetNet environment including various base stations or transmission nodes mentioned above, a terminal may report information to a base station during a movement when the terminal in to the idle state switches to the connected state.

For example, in a HetNet environment as shown in FIG. 1 or FIG. 2, service areas may be classified into a macro layer service area and a micro layer service area. Here, the macro layer service area may denote an area in which a macro base station such as an eNB or a normal cell provides service, and the micro layer service area may denote an area in which a micro base station such as a micro cell, a pico cell, a femto cell, a home cell or a CSG cell provides service.

A remote wireless node (e.g., RRH), a relay, etc. may be selectively included in a macro layer service area or a micro layer service area via the corresponding base station connected with a network system, thereby providing service.

In a HetNet environment as described above, a terminal in the connected state (RRC_connected state) is configured to receive service through RRm measurement and CSI measurement reporting via a cell constituting a macro layer service area when movement speed is high, and to receive service via a cell constituting a micro layer service area when movement speed is low, so that the quality of the service can be maintained according to a movement state of the terminal.

On the other hand, it is not possible to perform efficient connection control (RRC connection control) on a terminal in the idle state in which no connection has been established because it is not possible to know a movement state.

However, when the terminal provides MSE information and mobility history information to the corresponding cell in a connection establishment process, connection control for the terminal may be efficiently made.

For example, in example embodiments of the present invention, a terminal may be configured to report information on a cell or a node on which the terminal has camped in a predetermined time section and information on cell selection or cell reselection in the idle state, so that mobility history information on the terminal can be acquired. Here, the to camping cell information may include ID information such as a PCI, a global cell ID (GCI) and a transmission point ID of the corresponding cell, and information such as the number of cells in which the terminal has performed camping and a time (e.g., time of stay) for which the terminal has stayed in a camping cell. Also, the cell selection/reselection information may include the number of cells on which the terminal has performed cell selection/reselection for camping and ID information on the corresponding cells.

Table 1 shows types and meanings of parameters of mobility history information that can be used in managing mobility of a terminal.

Among the parameters shown in Table 1, parameters that can be set to ms, sf, rf, s, m, h, etc. may be set to times in the corresponding units, or expressed as predetermined time ranges or so on.

For example, the parameters that can be set in time units may be expressed as {0.5 m, 1 m, 5 m, 10 m}, or time units

TABLE 1

| Parameter Type | Parameter Meaning | Others |
| --- | --- | --- |
| Mobility History Information Forms | >Indicates whether mobility history information is for low-speed movement or high-speed movement<br>>0: is low-speed movement information, and mobility history information includes ID information and stay time information on a current cell of a cell in which a terminal has previously camped<br>>1: is high-speed movement information, and mobility history information includes the number of cells in which a terminal has camped in an arbitrary time section, the number of cells on which the terminal has performed cell selection/reselection, the number of cells in which the terminal has camped at the same time, and ID information on the corresponding cell | Expressed by one or more bits |
| Current Cell Information (ID) | An ID such as a PCI/GCI of a cell to which a connection is currently being attempted | Nine or more bits |
| Current Cell Information (Stay Time) | Stay time of a cell to which a connection is currently being attempted | Two or more bits, and can be set in units of milliseconds (ms), subframes (sf), radio frames (rf), seconds (s), minutes (m), hours (h), and so on |
| Previous Camping Cell Information (ID) | An ID such as a PCI/GCI of a cell in which a terminal has camped immediately before a current cell | Nine or more bits |
| Previous Camping Cell Information (Stay Time) | Stay time of a cell in which a terminal has camped immediately before a current cell | Two or more bits, and can be set in units of ms, sf, rf, s, m, h, and so on |
| Valid Time of Mobility History Information | A valid time section applied to acquire mobility history information | Two or more bits, and can be set in units of ms, sf, rf, s, m, h, and so on |
| Information on Camping Cell (Number) | The number of cells in which a terminal has camped before a cell to which a connection is currently being attempted in a valid time section of mobility history information | The maximum number of cells in which the terminal has camped can be limitedly set, and information on cells other than duplicated cells (e.g., cells having the same cell ID) |
| Information on Camping Cell (ID) | An ID such as a PCI/GCI of a cell in which a terminal has camped before a cell to which a connection is currently being attempted in a valid time section of mobility history information | |
| Number of Cells on Which Cell Selection/Reselection Has Been Performed | The number of cells on which a terminal has performed cell selection/reselection for camping before a cell to which a connection is currently being attempted in a valid time section of mobility history information | Indicates the number of cells including duplicated cells on which cell selection/reselection has been performed | and time ranges may be set in advance as shown in Table 2, and parameter values indicating the respective set time rages may be expressed as different bits.

TABLE 21

| Parameter Value | Time Range | Unit |
|---|---|---|
| 00 | 0 to 30 | S |
| 01 | 30 to 60 | |
| 10 | 60 to 300 | |
| 11 | 300 to 6000 | |

A terminal may selectively configure mobility history information on the terminal from among the parameters shown in Table 1 and Table 2 according to a mobility state (e.g., MSE) of the terminal estimated by the terminal itself, and report the mobility history information.

For example, a terminal may be configured to report current cell information (ID or stay time), previous camping cell information (ID or stay time), etc. when it is determined that MSE information or mobility state information generated in various ways is included in a predetermined range of a low speed.

Alternatively, a terminal may be configured to report information (number and IDs) on cells in which the terminal has camped in a predetermined time section (e.g., valid time of mobility history information), the number of cells on which cell selection/reselection has been performed, ID information on the corresponding cells, valid time of mobility history information, etc. when it is determined that a mobility state is included in a predetermined range of a high speed.

To efficiently manage terminals in the connected state in a HetNet environment, a terminal may be configured to receive service from a cell having a macro layer service area (or a cell having a micro layer service area) or receive service from a plurality of cells using the CoMP function in consideration of the number of cells that the terminal has passed through in an arbitrary time, the number of times of handover, the number of times of ping-pang handover, ping-pong handover cell information (IDs or the number of times of duplication), cell stay time (a stay time per cell or an average stay time), the number of times of handover between macro and micro layers or the number of cell changes, and so on.

Here, a base station may be configured to estimate the parameters, such as the number of cells that the terminal has passed through in a predetermined time, the number of times of handover, the number of times of ping-pong handover, the ping-pong handover cell information (IDs or the number of times of duplication), cell stay time (a stay time per cell or an average stay time), the number of times of handover between macro and micro layers or the number of cell changes, or the terminal may be configured to report the parameters to the corresponding base station using its own stored information.

In particular, when the number of cells that a terminal has passed through in the predetermined time or the number of times of handover is greater than a predetermined reference value (or threshold value) of the corresponding parameter, or a cell stay time (a stay time per cell or an average stay time) is less than a predetermined reference value (or threshold value) of the corresponding parameter, the terminal may receive service from a macro layer cell.

On the other hand, when the number of times of ping-pong handover performed by a terminal in a predetermined time is greater than a predetermined reference value (or threshold value) of the corresponding parameter, or a cell stay ti: a stay time per cell or an average stay time) is greater than a predetermined reference value (or threshold value) of the corresponding parameter, the terminal may receive service from a micro cell or receive service from a plurality of cells using the CoMP function.

Figure 9:
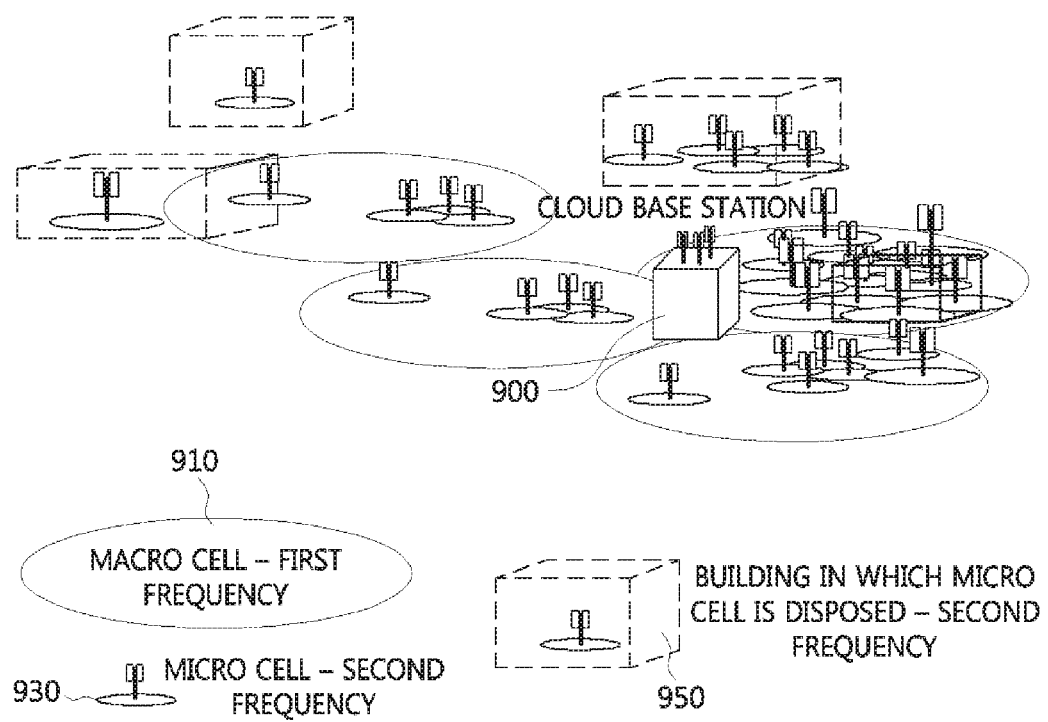
FIG. 9 is a conceptual diagram illustrating mobility management of a terminal in consideration of a small cell in a HetNet environment in a method of managing a terminal according to example embodiments of the present invention.

FIG. 9 is a conceptual diagram illustrating mobility management of a terminal in consideration of a small cell in a HetNet environment in a method of managing a terminal according to example embodiments of the present invention.

Referring to FIG. 9, when a plurality of macro cells 910 and a plurality of micro cells 930 have different frequencies in a HetNet environment including the macro cells 910 and the micro cells 930, mobility management efficiency for a terminal can be improved by reducing as many RRM measurement operations as possible.

In other words, when the macro cells 910 using a first frequency and the micro cells 930 using a second frequency constitute the same frequency domain, if a terminal has no transmission or reception data in the connected state, or is performing the DRX operation in the connected state, the terminal may not trigger or perform a handover procedure every time a cell is changed but may perform a handover procedure only when the terminal leaves a predetermined area according to the concept of the "log-in" state described above, or may measure only a frequency of a serving cell for RRM measurement without measuring other frequency resources. Here, the predetermined area may denote a geographical area, such as the inside of a building 950 or a school/large shopping mall 950 in which a small cell is installed, or an arbitrary area predetermined for managing a routing area, a tracking area, a local area, and so on.

Also, the macro cells 910 and the micro cells 930 may provide service according to the concept of a cloud base station 900.

Thus, a terminal according to example embodiments of the present invention can minimize its power consumption by measuring only a frequency of a layer of a cell with which the terminal is maintaining a connection, and reduce overload of a system by infrequently performing a handover procedure.

In addition, an Scell (e.g., a new carrier type) having only a downlink frequency in a base station environment supporting the CA function may be managed in a mode (off mode) in which downlink transmission of the Scell is stopped for a low-power consumption operation of a base station, and a mode (on mode) in which data is transmitted over a downlink of the Scell. In other words, an Scell may be managed in a stop mode (off mode) operation in which a base station does not transmit any signal over a downlink except for minimum downlink signals for measuring the Scell operating in the off mode when there is no terminal connecting to the corresponding cell and receiving service, and a transmission mode (on mode) operation in which there is a terminal that is receiving service via the corresponding cell or in need of service, and the Scell transmits control information and traffic information necessary for providing service over a downlink.

Minimum downlink signals transmitted in the stop mode to measure an Scell may be on the assumption of a synchronization channel or an additionally defined probing channel. These signals may occupy discrete radio resources in the time domain and the frequency domain, and may be discontinuously transmitted according to a discontinuous transmission (DTX) operation period of the corresponding cell.

Meanwhile, to efficiently perform mobility management in a HetNet environment consisting of macro base stations and micro base stations, a network may control a terminal to maintain a connection to only a base station belonging to a specific layer between a macro base station layer or a micro base station layer, but may also establish connections with a plurality of base stations belonging to two layers so that a terminal can maintain the connections and receive service. For example, this is a case of FIG. 1 in which the terminal to 153 maintains all connections with the macro base station 110 and a micro base station 120 to receive service.

Mobility management may be performed for a terminal that maintains all connections with a macro base station and a micro base station as mentioned above so that handover is not performed due to movement between micro base stations even when the terminal moves between service areas of the micro base stations in a macro base station. For example, this is a case of FIG. 1 in which the terminal 153 maintaining all connections with the macro base station 110 and the micro base station 120 moves from the area of the micro base station 120 to the area of another adjacent micro base station 120. In this case, a handover procedure is performed only when a macro base station is changed, and may be performed using a connection re-establishment procedure when a micro base station is changed.

Thus, it is possible to use a method in which a macro base station handles a control plane such as mobility management and RRC connection control for the corresponding terminal, and a micro base station handles a user plane such as traffic data transmission of the terminal, so that the macro base station and the micro base station handle the control plane and the user plane respectively. In this way, when an arbitrary terminal maintains all connections with a macro base station and a micro base station (referred to as "plural connections" below), the macro base station can also handle traffic data transmission of the user plane. In particular, it is possible to control a macro base station to transmit data of a voice service, such as voice over Internet protocol (VoIP), or service in which quality of service (QoS) needs to be ensured, and real-time services.

Plural connections may he established in a procedure in which a terminal establishes a connection with an arbitrary base station or while a terminal has already been maintaining a connection with an arbitrary base station, and at this time, the base station may make a determination according to a capability of the terminal, characteristics of a connection service (e.g., jitter variance and latency), attributes of a backhaul between the terminal and the base station, and a load status of the base station. Also, a plural connection system may determine a base station having a priority for supporting plural connections between a macro base station and a micro base station. The determined priority base station (e.g., Pcell or anchor cell) may leadingly perform a control procedure for establishing plural connections. Thus, the priority base station may instruct a terminal to establish plural connections through a connection establishment or re-establishment message, and forward information, such as radio resources necessary at this time, an ID of the priority base station, a scheduling ID, and a ciphering key, to the terminal. In case of need, the system may forward a plural connection request message for confirming the necessity of plural connections or checking whether or not the terminal agrees on plural connections to the terminal. When the terminal registers in a network or establishes a connection, the terminal may report capability information indicating whether or not plural connections are possible, or transmit plural connection activation/deactivation information indicating whether or not plural connections are necessary. Thus, even if a terminal is capable of plural connections, the system may be configured neither to transmit information indicating deactivation of plural connections nor to attempt a plural connection procedure on the terminal when the terminal has transmitted or set information indicating deactivation of plural connections.

When the plural connection function is used, base stations supporting plural connections may use the same scheduling ID and ciphering key for the corresponding terminal. To use the same ciphering key, a ciphering key an eNB key (KeNB)) of a base station having a priority between a macro base station and a micro base station may be shared with the other base station participating in the plural connections, and a ciphering procedure such as ciphering and integrity check of the terminal may be performed.

Thus, when a macro base station has a priority, the macro base station may forward packet data (e.g., a PDCP PDU) on which a ciphering process has been performed to a micro base station using a connection (interface) between the base stations and transmit the packet data to the corresponding terminal using an RLC/MAC/physical (PHY) layer of the micro base station, or the macro base station may notify the micro base station of a ciphering key using a signaling message, and the micro base station may transmit the packet data to the terminal by performing a PDCP/RLC/MAC/PHY process using the ciphering key of the macro base station rather than a ciphering key of the micro base station. On the other hand, when a micro base station has a priority, the micro base station performs the above procedure using a ciphering key. Thus, even when a terminal maintains all connections with a macro base station and a micro base station, it is possible to transmit and receive data using one ciphering key.

As described above, even when a terminal maintains all connections with a macro base station and a micro base station, it is possible to set the same scheduling ID to be shared in order to lower the complexity with which the terminal detects a scheduling ID in a physical control channel (e.g., PDCCH or enhanced PDCCH (ePDCCH)). For example, all base stations (or cells) with which connections are maintained may be set to use the same scheduling ID as a scheduling ID (e.g., semi-persistent scheduling (SPS) C-RNTI) for an SPS service and a scheduling II) for a dynamic scheduling service. To this end, scheduling IDs (e.g., a C-RNTI, a SPS C-RNTI, a transmit power control (TPC)-PUCCH-RNTI, and a TPC-physical uplink shared channel (PUSCH)-RNTI) may be assigned to the corresponding terminal using a control message of a procedure in which a macro base station and a micro base station establish connections at the same time. Alternatively, a scheduling ID assigned by a (macro or micro) base station that has established a connection first may be used. Alternatively, a C-RNTI may be additionally assigned by each base station, and the same SPS C-RNTI may be used. In this case, the terminal is assigned a plurality of C-RNTIs and the one SPS C-RNTI to operate. In other words, the terminal receives the SPS service using the one SPS C-RNTI that is the same scheduling ID assigned by the plurality of base stations or one base station, and receives services that require dynamic assignment of other packet data, to a control message, etc. using the plurality of C-RNTIs that are assigned scheduling IDs. That is, respective base stations connected for plural connections may be assigned different C-RNTIs and managed. For example, when a terminal is connected to two base stations, one of two C-RNTIs that have been assigned by the respective base stations is a scheduling ID used for a macro base station to uniquely identify the terminal, and the other is a scheduling ID used for a micro base station to uniquely identify the terminal.

A macro base station and a micro base station supporting plural connections need to forward their allocation information on radio resources, for example, CSI, a CSI-RS, a DM-RS, a UE-specific RS, a sounding RS (SRS), and a PUCCH, to a base station having a priority at least every time plural connections are established. The respective base stations need to assign the radio resources (CSI, a CSI-RS, a DM-RS, a UE-specific RS, an SRS, and a PUCCH) to support a terminal that receives service using a connection with the macro base station or the micro base station only without plural connections, and thus need to forward radio resource allocation information to a base station (e.g., a Pcell or an anchor cell) having a priority so as to avoid collision when radio resources related to plural connections are allocated to support the plural connections.

To support the above-described plural connections such as inter-site CA of maintaining all connections with a macro base station and a micro base station and receiving service, the RRC function of handling connection control may be wholly handled by a base station (Pcell or anchor cell) having a priority, or shared by the respective base stations.

Thus, there is a necessity for a procedure of setting a base station having a priority between base stations in a process of establishing plural connections. At this time, radio resources such as CSI, a CSI-RS, a DM-RS, a UE-specific RS, an SRS and a PUCCH for the corresponding terminal and control information such as an SPS C-RNTI, a. C-RNTI and a ciphering key may be signaled as a control message between the base stations, and the terminal may be notified of the radio resources and the control information using a control tt message in a connection re-establishment procedure.

In addition, when plural connections are closed, and only one base station maintains a connection, the corresponding terminal is notified of release information for resources that are repeatedly allocated for the plural connections or a plurality of resources allocated for the plural connections (e.g., two assigned C-RNTIs or PUCCH resources allocated to respective base stations) or allocation information for a single connection using a control message.

In other words, when release information is received, the terminal releases the corresponding resources, and when the allocation information for a single connection is received, the terminal ignores resources allocated for the plural connections and maintains the single connection using radio resources or a scheduling ID allocated through the control message for the single connection.

When service is provided while plural connections are maintained as described above, an HARQ operation may be performed in the following procedure. To support HARQ of downlink transmission data from a base station to a terminal, respective base stations may separately allocate PUCCH resources to the terminal and separately perform the HARQ operation, or one base station may allocate PUCCH resources for all the base stations and perform the HARQ operation.

On the other hand, to support HARQ of uplink transmission data from a terminal to a. base station, one base station may transmit a physical HARQ indicator channel (PHICH) and perform the HARQ operation.

According to a method of managing a terminal in a HetNet environment as described above, it is possible to improve a measurement operation and DRX operation control procedure necessary for connection control between one or more base stations and a terminal in a HetNet environment supporting CA and a CoMP function in which a plurality of base stations cooperate to provide service, and thereby performance of a system can be improved.

In addition, by providing a control procedure for mobility management and low-power operation of terminals in a network environment that provides service to an MTC terminal, a D2D terminal, and terminals generating traffic having a variety of profiles, it is possible to increase a transmission rate of a mobile communication system, improve interference control or interference avoidance performance, ensure continuity of the service, and reduce power consumption of the terminals.

While the example embodiments of the present invention and their advantages have been described in detail, it should be understood that various changes, substitutions and alterations may be made herein without departing from the scope of the invention.

What is claimed is:

1. An operation method performed by a user equipment, (UE), the operation method comprising:
   transmitting, to a base station, a first message including first discontinuous reception (DRX) configuration information desired by the UE;
   receiving, from the base station, a second message in response to the first message, wherein the second message includes second DRX configuration information, and the second DRX configuration information is determined based on the first DRX configuration information; and
   performing, by the UE, a DRX operation using the second DRX configuration information.

2. The operation method of claim 1, wherein the first message is transmitted from the UE to the base station when a pre-defined condition is satisfied.

3. The operation method of claim 2, wherein the pre-defined condition includes at least one of cases where an event is triggered based on channel status, the UE is located within a specific region in a coverage of the base station, a user setting related to the DRX operation is changed, or a timer related to the DRX operation is expired.

4. The operation method of claim 1, wherein the second DRX configuration information includes at least one of a DRX period, an on-duration timer, an inactivity timer, and a retransmission timer.

* * * * *